United States Patent
Shibata et al.

(10) Patent No.: US 11,001,194 B2
(45) Date of Patent: May 11, 2021

(54) VEHICULAR LAMP SYSTEM, VEHICULAR LAMP CONTROL DEVICE, AND VEHICULAR LAMP CONTROL METHOD

(71) Applicant: KOITO MANUFACTURING CO., LTD., Tokyo (JP)

(72) Inventors: Yoshinori Shibata, Shizuoka (JP); Takao Muramatsu, Shizuoka (JP)

(73) Assignee: KOITO MANUFACTURING CO., LTD., Tokyo (JP)

(*) Notice: Subject to any disclaimer, the term of this patent is extended or adjusted under 35 U.S.C. 154(b) by 0 days.

(21) Appl. No.: 16/728,459

(22) Filed: Dec. 27, 2019

(65) Prior Publication Data

US 2020/0139879 A1    May 7, 2020

Related U.S. Application Data

(63) Continuation of application No. PCT/JP2018/022257, filed on Jun. 11, 2018.

(30) Foreign Application Priority Data

Jun. 27, 2017   (JP) .............................. JP2017-125498
Jul. 5, 2017   (JP) .............................. JP2017-132056

(51) Int. Cl.
   *B60Q 1/14*         (2006.01)
   *H05B 47/125*     (2020.01)
   *B60R 11/04*       (2006.01)

(52) U.S. Cl.
   CPC ............ *B60Q 1/1415* (2013.01); *B60R 11/04* (2013.01); *H05B 47/125* (2020.01)

(58) Field of Classification Search
   CPC ...... B60Q 1/1415; H05B 47/125; B60R 11/04
   See application file for complete search history.

(56) References Cited

U.S. PATENT DOCUMENTS

2008/0084165 A1*   4/2008   Otsuka .................. H04N 7/183
                                                           315/82
2011/0012511 A1    1/2011   Watanabe
(Continued)

FOREIGN PATENT DOCUMENTS

EP         3591576 A1    1/2020
JP       H01-309836 A   12/1989
(Continued)

OTHER PUBLICATIONS

Machine Translation of JP01-309836A.*
(Continued)

*Primary Examiner* — Alexander H Taningco
*Assistant Examiner* — Pedro C Fernandez
(74) *Attorney, Agent, or Firm* — Buchanan Ingersoll & Rooney PC

(57) ABSTRACT

A vehicular lamp system includes: an imager; a luminance analyzer that detects a luminance of each of multiple individual regions; an illuminance setting unit that determines an illuminance value of light emitted to each individual region, based on a detection result from the luminance analyzer; a light source unit; and a light source controller that controls the light source unit. The illuminance setting unit uses different functions to determine the illuminance value for an individual region that falls within a certain first luminance range, and the illuminance value for an individual region that falls within a certain second luminance range.

9 Claims, 15 Drawing Sheets

(56) References Cited

U.S. PATENT DOCUMENTS

| | | | |
|---|---|---|---|
| 2014/0043805 A1 | 2/2014 | Yamamura | |
| 2015/0085514 A1* | 3/2015 | Yagi | F21S 41/16 362/538 |
| 2015/0127227 A1 | 5/2015 | Strolz et al. | |
| 2018/0345847 A1* | 12/2018 | Weissenberger | H05B 47/105 |

FOREIGN PATENT DOCUMENTS

| | | |
|---|---|---|
| JP | 2008-094127 A | 4/2008 |
| JP | 2009-090844 A | 4/2009 |
| JP | 2012-227102 A | 11/2012 |
| JP | 2015-064964 A | 4/2015 |

OTHER PUBLICATIONS

International Preliminary Report on Patentability (Form PCT/IB/373) dated Dec. 31, 2019, in the corresponding international Application No. PCT/JP2018/022257. (1 page).

International Search Report and Written Opinion of the International Searching Authority (Forms PCT/ISA/210 and PCT/ISA/237) dated Aug. 28, 2018, in the corresponding international Application No. PCT/JP2018/022257. (20 pages).

Extended Search Report issued by the European Patent Office in corresponding European Patent Application No. 18824989.0-1209 dated Feb. 23, 2021 (11 pages).

* cited by examiner

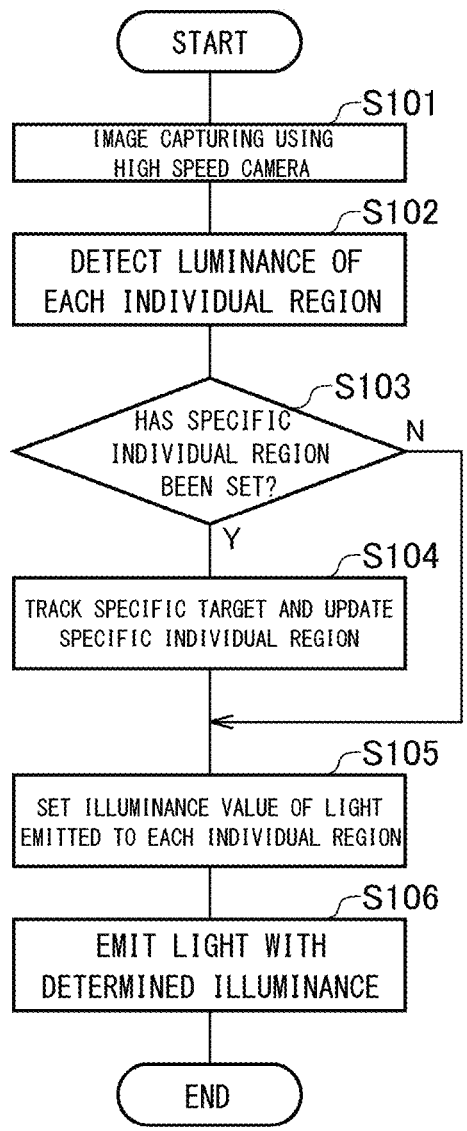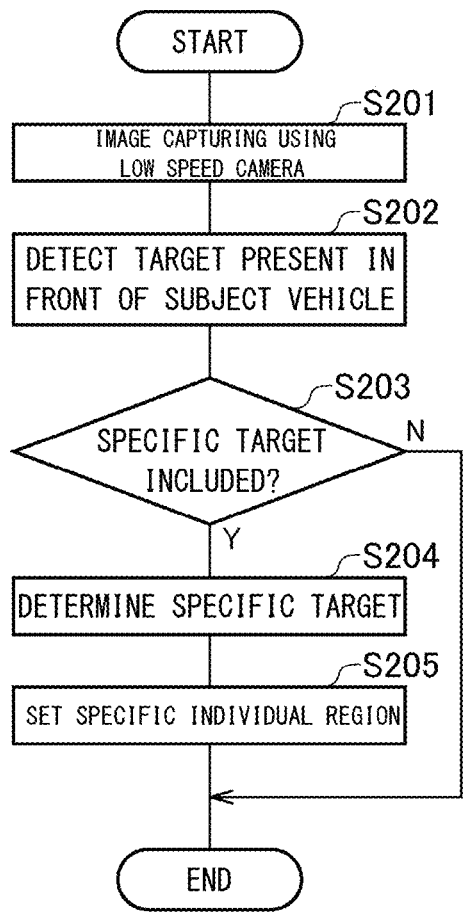

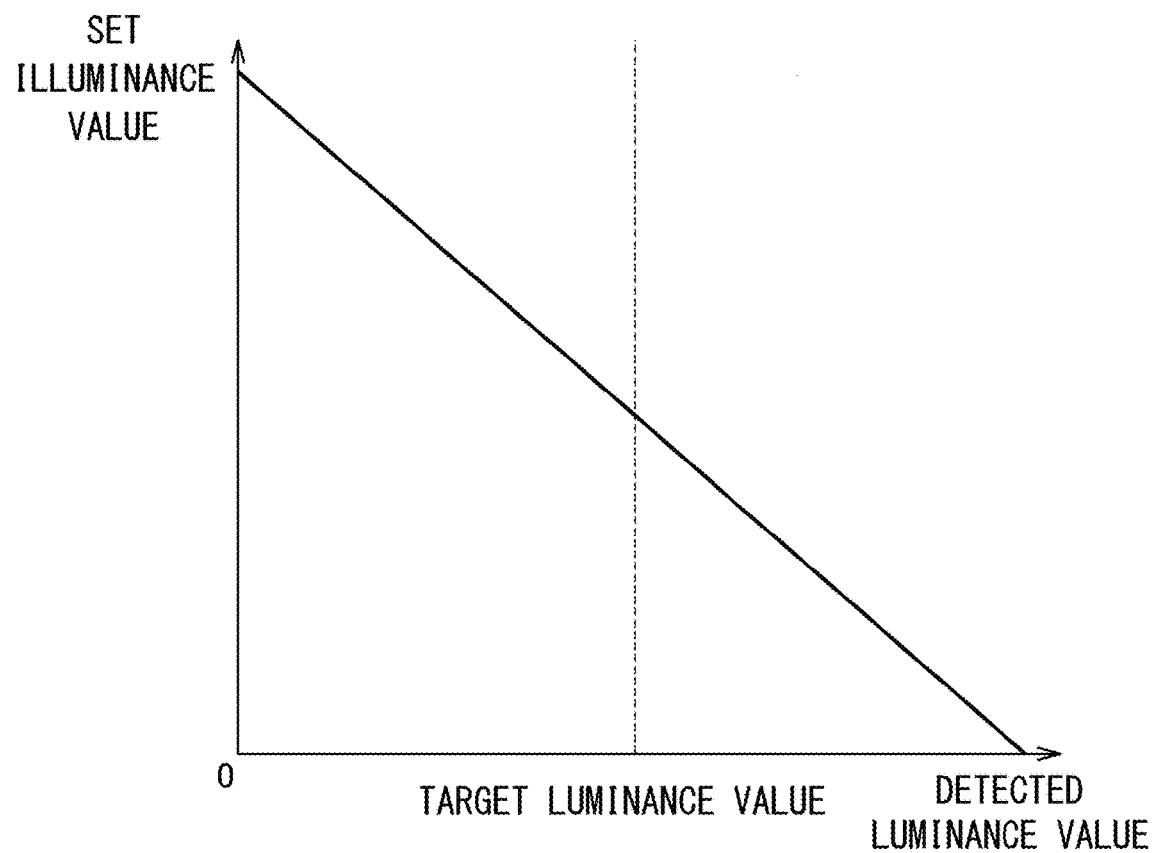

VEHICULAR LAMP SYSTEM, VEHICULAR LAMP CONTROL DEVICE, AND VEHICULAR LAMP CONTROL METHOD

CROSS-REFERENCE TO RELATED APPLICATIONS

This application is based upon and claims the benefit of priority from the prior Japanese Patent Application No. 2017-125498, filed on Jun. 27, 2017, the prior Japanese Patent Application No. 2017-132056, filed on Jul. 5, 2017, and International Patent Application No. PCT/JP2018/022257, filed on Jun. 11, 2018, the entire content of each of which is incorporated herein by reference.

BACKGROUND

Field of the Invention

The present invention relates to a vehicular lamp system, a vehicular lamp control device, and a vehicular lamp control method, and particularly to a vehicular lamp system, a vehicular lamp control device, and a vehicular lamp control method used for automobiles or the like.

Description of the Related Art

Vehicular lamps capable of producing various light distribution patterns are conventionally known. For example, Patent Literature 1 discloses a technology for producing light distribution patterns using a digital mirror device (DMD) including multiple micro mirrors arranged in an array. Also, Patent Literature 2 discloses a technology for producing light distribution patterns using a scanning optical system for scanning an area in front of the subject vehicle using light from a light source. Also, Patent Literature 3 discloses a technology for producing light distribution patterns using an LED array. Further, it is also known to perform, using such vehicular lamps, adaptive driving beam (ADB) control for producing light distribution patterns based on the position of a vehicle or the like in front of the subject vehicle.

Patent Literature 1: Japanese Unexamined Patent Application Publication No. 2015-064964
Patent Literature 2: Japanese Unexamined Patent Application Publication No. 2012-227102
Patent Literature 3: Japanese Unexamined Patent Application Publication No. 2008-094127

As a result of intensive study regarding conventional vehicular lamps, the inventors have found that there is room for increasing the types of producible light distribution patterns. Also, as a result of intensive study regarding the ADB control, the inventors have found that there is room for improving irradiation accuracy when light is emitted in consideration of the condition in front of the subject vehicle.

SUMMARY OF THE INVENTION

The present invention has been made in view of such a situation, and one purpose thereof is to provide a technology for increasing the types of producible light distribution patterns. Also, another purpose of the present invention is to provide a technology for improving light irradiation accuracy of a vehicular lamp.

To solve the problem above, one aspect of the present invention is a vehicular lamp system. The vehicular lamp system includes: an imager that captures an image of an area in front of the subject vehicle; a luminance analyzer that detects a luminance of each of a plurality of individual regions arranged in front of the subject vehicle, on the basis of information acquired from the imager; an illuminance setting unit that determines an illuminance value of light emitted to each individual region, on the basis of a detection result from the luminance analyzer; a light source unit that independently controls the illuminance of light emitted to each of the plurality of individual regions; and a light source controller that controls the light source unit on the basis of an illuminance value determined at the illuminance setting unit. The illuminance setting unit uses different functions to determine the illuminance value for an individual region that falls within a predetermined first luminance range, and the illuminance value for an individual region that falls within a predetermined second luminance range.

Another aspect of the present invention is a control device for a vehicular lamp. The control device includes: a luminance analyzer that detects a luminance of each of a plurality of individual regions arranged in front of the subject vehicle, on the basis of information acquired from an imager that captures an image of an area in front of the subject vehicle; an illuminance setting unit that determines an illuminance value of light emitted to each individual region, on the basis of a detection result from the luminance analyzer; and a light source controller that controls a light source unit that independently controls the illuminance of light emitted to each individual region, on the basis of an illuminance value determined at the illuminance setting unit. The illuminance setting unit uses different functions to determine the illuminance value for an individual region of which the luminance is included in a predetermined first range, and the illuminance value for an individual region of which the luminance is included in a predetermined second range.

Yet another aspect of the present invention is a control method for a vehicular lamp. The control method includes: detecting a luminance of each of a plurality of individual regions arranged in front of the subject vehicle, on the basis of information acquired from an imager that captures an image of an area in front of the subject vehicle; determining an illuminance value of light emitted to each individual region, on the basis of a detected luminance; and controlling a light source unit that independently controls the illuminance of light emitted to each individual region, on the basis of a determined illuminance value. In the determining an illuminance value, different functions are used to determine the illuminance value for an individual region of which the luminance is included in a predetermined first range, and the illuminance value for an individual region of which the luminance is included in a predetermined second range.

Still yet another aspect of the present invention is a vehicular lamp system. The vehicular lamp system includes: a visible light imager; a far-infrared imager; a luminance analyzer that detects a luminance of each of a plurality of individual regions arranged in front of the subject vehicle, on the basis of information acquired from the visible light imager; a target analyzer that detects a target present in front of the subject vehicle, at least on the basis of information acquired from the far-infrared imager; an illuminance setting unit that determines, on the basis of a detection result from the luminance analyzer and a detection result from the target analyzer, the illuminance value of light emitted to each individual region, including a specific illuminance value for a specific individual region determined on the basis of the position at which a predetermined target is present; a light source unit that independently controls the illuminance of light emitted to each of the plurality of individual regions;

and a light source controller that controls the light source unit on the basis of an illuminance value determined at the illuminance setting unit.

Still yet another aspect of the present invention is a control device for a vehicular lamp. The control device includes: a luminance analyzer that detects a luminance of each of a plurality of individual regions arranged in front of the subject vehicle, on the basis of information acquired from the visible light imager; a target analyzer that detects a target present in front of the subject vehicle, at least on the basis of information acquired from the far-infrared imager; an illuminance setting unit that determines, on the basis of a detection result from the luminance analyzer and a detection result from the target analyzer, the illuminance value of light emitted to each individual region, including a specific illuminance value for a specific individual region determined on the basis of the position at which a predetermined target is present; and a light source controller that controls a light source unit that independently controls the illuminance of light emitted to each individual region, on the basis of an illuminance value determined at the illuminance setting unit.

A further aspect of the present invention is a control method for a vehicular lamp. The control method includes: detecting a luminance of each of a plurality of individual regions arranged in front of the subject vehicle, on the basis of information acquired from a visible light imager; detecting a target present in front of the subject vehicle, at least on the basis of information acquired from a far-infrared imager; determining, on the basis of a detection result in the detecting a luminance and a detection result in the detecting a target, the illuminance value of light emitted to each individual region, including a specific illuminance value for a specific individual region determined on the basis of the position at which a predetermined target is present; and controlling a light source unit that independently controls the illuminance of light emitted to each individual region, on the basis of a determined illuminance value.

Optional combinations of the aforementioned constituting elements, and implementation of the present invention in the form of methods, apparatuses, or systems may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 5A and 5B are flowcharts that each show an example of ADB control performed in the vehicular lamp system according to the first embodiment;

FIG. 10 is a diagram that shows relationships between the detected luminance value and the set illuminance value in luminance equalization control;

DETAILED DESCRIPTION OF THE INVENTION

Figure 1:
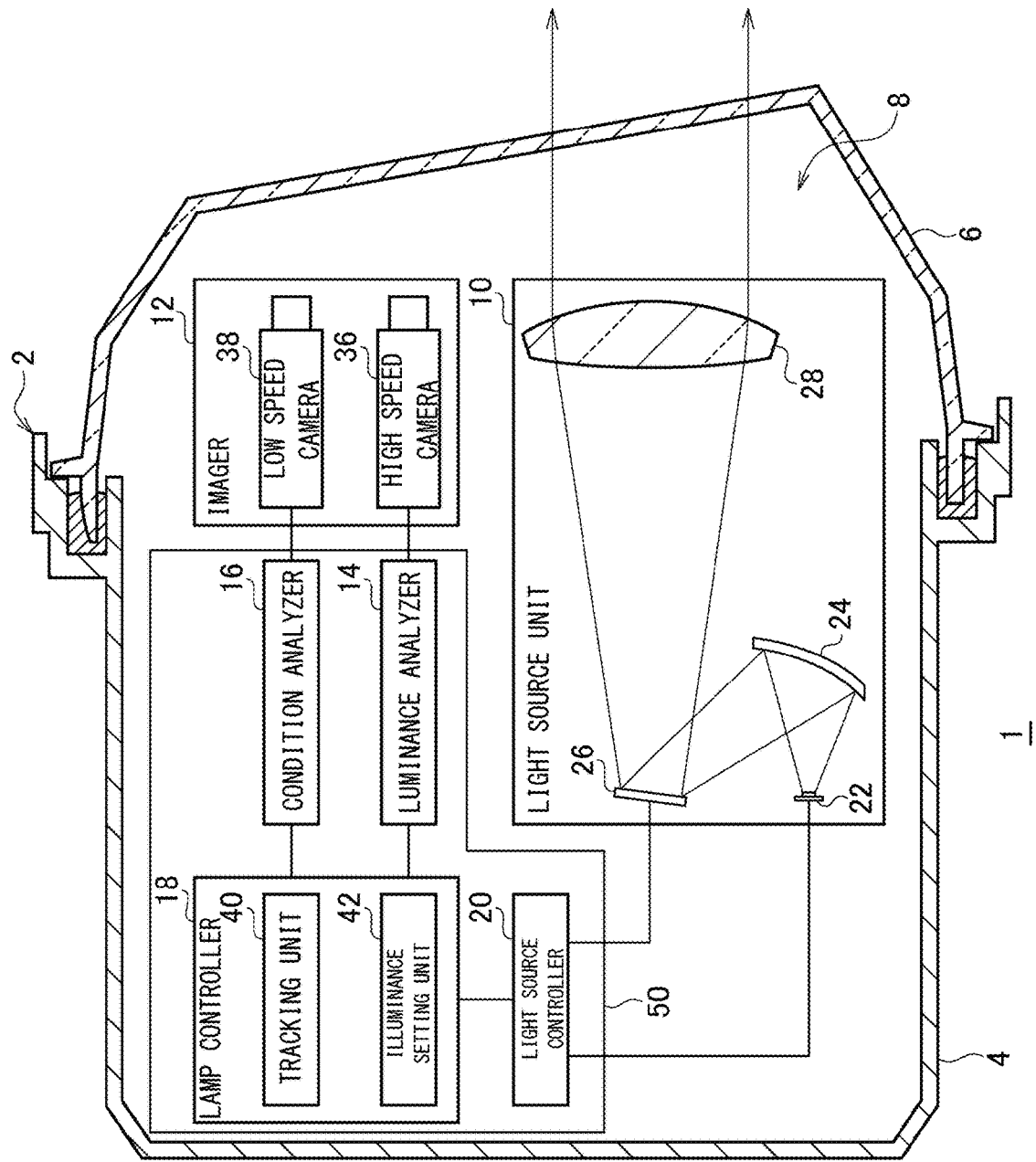
FIG. 1 is a diagram that shows a schematic configuration of a vehicular lamp system according to a first embodiment.

One embodiment is a vehicular lamp system. The vehicular lamp system includes: an imager that captures an image of an area in front of the subject vehicle; a luminance analyzer that detects a luminance of each of a plurality of individual regions arranged in front of the subject vehicle, on the basis of information acquired from the imager; an illuminance setting unit that determines an illuminance value of light emitted to each individual region, on the basis of a detection result from the luminance analyzer; a light source unit that independently controls the illuminance of light emitted to each of the plurality of individual regions; and a light source controller that controls the light source unit on the basis of an illuminance value determined at the illuminance setting unit. The illuminance setting unit uses different functions to determine the illuminance value for an individual region that falls within a predetermined first luminance range, and the illuminance value for an individual region that falls within a predetermined second luminance range.

In the abovementioned embodiment, the illuminance setting unit may sets the illuminance value for the individual region falling within the first luminance range on the basis of the luminance detected by the luminance analyzer, and may set the illuminance value for the individual region falling within the second luminance range irrespective of the luminance detected by the luminance analyzer. Also, in the abovementioned embodiment, the illuminance setting unit may set the illuminance value for the individual region falling within the first luminance range and the individual region falling within the second luminance range, on the basis of the luminance detected by the luminance analyzer, and the correspondence relationship between the detected luminance and the set illuminance may be set differently for each of the first luminance range and the second luminance range. Also, in the abovementioned embodiment, the first luminance range may include luminances lower than those in the second luminance range. Also, in the abovementioned embodiment, the illuminance value for the individual region falling within the first luminance range may have a positive correlation with the luminance. Also, in the abovementioned embodiment, each of the illuminance value for the individual region falling within the first luminance range and the illuminance value for the individual region falling within the second luminance range may have a positive correlation with the luminance. Also, in any one of the abovementioned embodiment, for an individual region falling within a predetermined third luminance range, which includes luminances higher than those in the first luminance range and the second luminance range, the illuminance setting unit may set the illuminance value on the basis of the luminance detected by the luminance analyzer such that the illuminance value has a negative correlation with the luminance, or the illuminance setting unit may set the illuminance value to zero irrespective of the luminance detected by the luminance analyzer.

Another embodiment is a vehicular lamp system. The vehicular lamp system includes: a visible light imager; a far-infrared imager; a luminance analyzer that detects a luminance of each of a plurality of individual regions arranged in front of the subject vehicle, on the basis of information acquired from the visible light imager; a target analyzer that detects a target present in front of the subject vehicle, at least on the basis of information acquired from the far-infrared imager; an illuminance setting unit that determines, on the basis of a detection result from the luminance analyzer and a detection result from the target analyzer, the illuminance value of light emitted to each individual region, including a specific illuminance value for a specific individual region determined on the basis of the position at which a predetermined target is present; a light source unit that independently controls the illuminance of light emitted to each of the plurality of individual regions; and a light source controller that controls the light source unit on the basis of an illuminance value determined at the illuminance setting unit.

In the abovementioned embodiment: the visible light imager may include a high speed camera and a low speed camera; the luminance analyzer may detect the luminance on the basis of information acquired from the high speed camera; the target analyzer may detect the target on the basis of information acquired from the low speed camera and the far-infrared imager; the vehicular lamp system may further include a tracking unit that determines a specific target among targets detected by the target analyzer and that detects displacement of the specific target; and, on the basis of a detection result from the luminance analyzer and a detection result from the tracking unit, the illuminance setting unit may determine the illuminance value of light emitted to each individual region, including a specific illuminance value for a specific individual region determined on the basis of the position at which the specific target is present. Also, in any one of the abovementioned embodiment, with regard to each individual region of which the luminance detected by the luminance analyzer is included in a predetermined range, among the individual regions other than the specific individual region, the illuminance setting unit may set a relatively low illuminance value for an individual region of which the detected luminance is relatively low, and may set a relatively high illuminance value for an individual region of which the detected luminance is relatively high.

In the following, the present invention will be described based on preferred embodiments with reference to the drawings. Embodiments of the invention are provided for purposes of illustration and not limitation, and it should be understood that not all of the features or combinations thereof described in the embodiments are necessarily essential to the invention.

Like reference characters denote like or corresponding constituting elements, members, and processes in each drawing, and repetitive description will be omitted as appropriate. Also, the scale or shape of each component shown in each drawing is set for the sake of convenience to facilitate the explanation and is not to be regarded as limitative unless otherwise specified. Further, when the terms "first", "second", and the like are used in the present specification or claims, such terms do not imply any order or importance and are used to distinguish one configuration from another, unless otherwise specified.

First Embodiment

FIG. 1 is a diagram that shows a schematic configuration of a vehicular lamp system according to the first embodiment. In FIG. 1, part of the constituting elements of a vehicular lamp system 1 are illustrated as functional blocks. Each of the functional blocks may be implemented by an element such as a CPU or memory of a computer or by a circuit as a hardware configuration, and by a computer program or the like as a software configuration. It will be obvious to those skilled in the art that the functional blocks may be implemented in a variety of forms by combinations of hardware and software.

The vehicular lamp system 1 may be applicable to a vehicular headlamp device provided with a pair of headlamp units disposed on the left and right sides of the front part of a vehicle. Since the pair of headlamp units have substantially the same configuration except that they have symmetrical structures, FIG. 1 shows the structure of one headlamp unit as a vehicular lamp 2. The vehicular lamp 2 in the vehicular lamp system 1 includes a lamp body 4 having an opening part on the front side of the vehicle, and a translucent cover 6 attached to cover the opening part of the lamp body 4. The translucent cover 6 is made of resin, glass, or the like having translucency. The lamp body 4 and the translucent cover 6 form a lamp chamber 8, in which a light source unit 10, an imager 12, and a control device 50 are housed.

Figure 3:
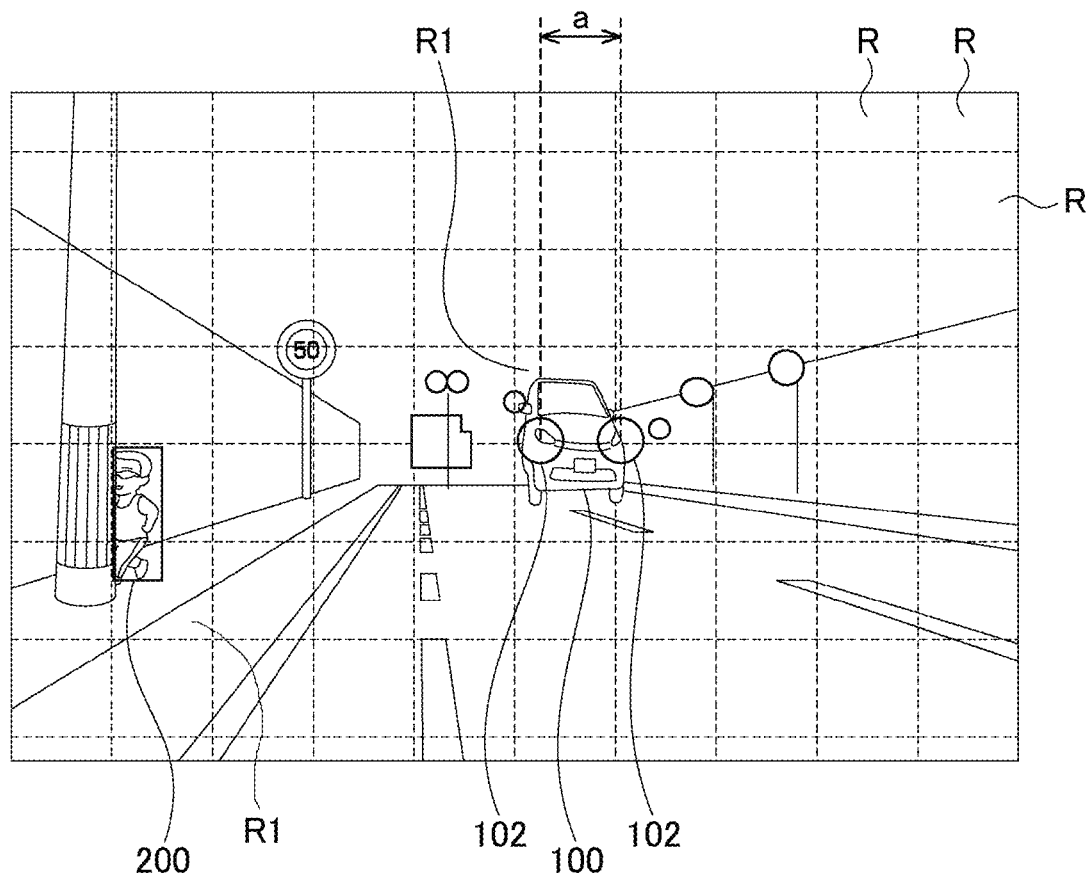
FIG. 3 is a diagram that schematically shows a state of an area in front of the subject vehicle.

The light source unit 10 is a device that can independently control the illuminance (strength) of light emitted to each of multiple individual regions arranged in front of the subject vehicle (see FIG. 3). The light source unit 10 includes a light source 22, a reflective optical member 24, an optical deflection device 26, and a projective optical member 28. Each component is attached to the lamp body 4 by means of a support mechanism, which is not illustrated.

As the light source 22, a semiconductor light emitting element, such as a light emitting diode (an LED), a laser diode (an LD), and an electroluminescence (EL) element, a light bulb, an incandescent lamp (a halogen lamp), an electric-discharge lamp (a discharge lamp), or the like may be used.

The reflective optical member 24 is configured to lead the light emitted from the light source 22 to a reflecting surface of the optical deflection device 26. The reflective optical member 24 is constituted by a reflecting mirror of which the inner surface is a certain reflecting surface. The reflective optical member 24 may also be a solid light guide or the like. When the light emitted from the light source 22 can be directly led to the optical deflection device 26, the reflective optical member 24 need not necessarily be provided.

The optical deflection device 26 is disposed on an optical axis of the projective optical member 28 and configured to selectively reflect the light emitted from the light source 22 to the projective optical member 28. The optical deflection device 26 may be constituted by a digital mirror device (DMD), for example. More specifically, the optical deflection device 26 includes multiple micro mirrors arranged in an array (a matrix). By controlling the angle of the reflecting surface of each of the multiple micro mirrors, the reflecting direction of the light emitted from the light source 22 can be selectively changed. More specifically, the optical deflection device 26 can reflect part of the light emitted from the light source 22 toward the projective optical member 28, and also can reflect the rest of the light toward a direction in which the rest of the light will not be effectively used by the projective optical member 28. The direction in which the rest of the light will not be effectively used may be a direction in which the light will be incident on the projective optical member 28 but will hardly contribute to production of a light distribution pattern, or may be a direction toward a light absorbing member (light-shielding member), which is not illustrated.

Figure 2A:
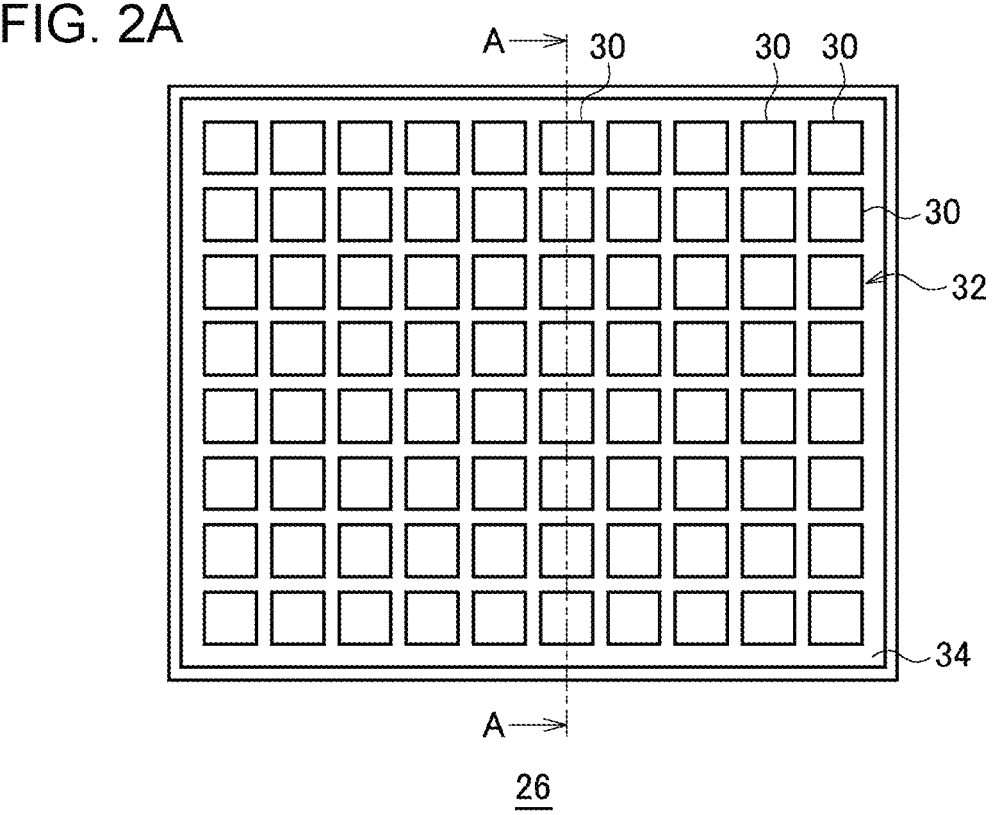
FIG. 2A is a front view that shows a schematic configuration of an optical deflection device.
Figure 2B:
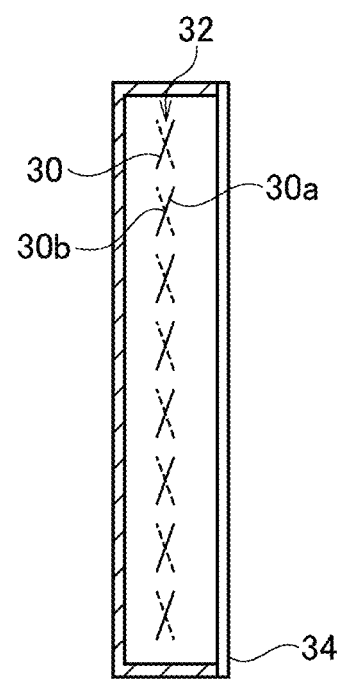
FIG. 2B is a sectional view of the optical deflection device taken along line A-A of FIG. 2A.

FIG. 2A is a front view that shows a schematic configuration of the optical deflection device. FIG. 2B is a sectional view of the optical deflection device taken along line A-A of FIG. 2A. The optical deflection device 26 includes a micro mirror array 32 in which multiple micro mirror elements 30 are arranged in a matrix, and a transparent cover member 34 provided in front of reflecting surfaces 30a of the mirror elements 30 (on the right side of the optical deflection device 26 shown in FIG. 2B). The cover member 34 may be made of glass or plastic, for example.

Each mirror element 30 has a substantially square shape and includes a rotational shaft 30b that extends in a horizontal direction and nearly bisects the mirror element 30. Each mirror element 30 of the micro mirror array 32 is configured such that the position thereof can be switched between a first reflecting position (a position indicated by a solid line in FIG. 2B) at which the mirror element 30 reflects the light emitted from the light source 22 toward the projective optical member 28 such that the light will be used as part of a desired light distribution pattern, and a second reflecting position (a position indicated by a dotted line in FIG. 2B) at which the mirror element 30 reflects the light emitted from the light source 22 such that the light will not be effectively used. Each mirror element 30 rotates about the rotational shaft 30b, and the position of each mirror element 30 can be individually switched between the first reflecting position and the second reflecting position. The position of each mirror element 30 is set to the first reflecting position when the mirror element 30 is turned on, and set to the second reflecting position when the mirror element 30 is turned off.

FIG. 3 is a diagram that schematically shows a state of an area in front of the subject vehicle. As described previously, the light source unit 10 includes multiple mirror elements 30 as individual emission parts that each can independently emit light frontward of the lamp. By means of the mirror elements 30, the light source unit 10 can emit light to multiple individual regions R arranged in front of the subject vehicle. Each individual region R corresponds to one pixel or a group of multiple pixels for the imager 12, more specifically a high speed camera 36, for example. In the present embodiment, the individual regions R are respectively related to the mirror elements 30.

Although each of FIGS. 2A and 3 shows the mirror elements 30 and the individual regions R as an array of 8 rows and 10 columns for the sake of convenience, the number of mirror elements 30 and individual regions R is not particularly limited. For example, the resolution of the micro mirror array 32 (in other words, the number of mirror elements 30 and individual regions R) may be 1,000-300,000 pixels. Meanwhile, the time it takes the light source unit 10 to produce one light distribution pattern may be 0.1-5 ms, for example. Therefore, the light source unit 10 can change the light distribution pattern every 0.1-5 ms.

As shown in FIG. 1, the projective optical member 28 may be constituted by a free-curved surface lens of which the front-side surface and the rear-side surface each have a free-curved surface shape, for example. The projective optical member 28 projects a light source image formed on a rear focal surface including the rear focal point, as an inverted image forward of the lamp. The projective optical member 28 is disposed such that the rear focal point thereof is positioned on an optical axis of the vehicular lamp 2 and near the reflecting surface of the micro mirror array 32. The projective optical member 28 may also be a reflector.

The light emitted from the light source 22 is reflected by the reflective optical member 24 and provided to the micro mirror array 32 of the optical deflection device 26. The optical deflection device 26 reflects light toward the projective optical member 28 by means of certain mirror elements 30 placed at the first reflecting position. The reflected light travels through the projective optical member 28 and frontward of the lamp to be provided to the individual regions R respectively corresponding to the mirror elements 30. Accordingly, a predetermined shape of light distribution pattern can be produced in front of the lamp.

The imager 12 is a device that captures an image of an area in front of the subject vehicle. The imager 12 includes the high speed camera 36. The high speed camera 36 has a relatively high frame rate, which may be in the range from 200 fps to 10,000 fps inclusive (0.1-5 ms per frame), for example. Also, the high speed camera 36 has relatively low resolution, which may be 300,000 pixels or greater and less than 5,000,000 pixels, for example. The high speed camera 36 captures an image of all the individual regions R.

The control device 50 includes a luminance analyzer 14, a lamp controller 18, and a light source controller 20. The image data acquired by the imager 12 is transmitted to the luminance analyzer 14.

The luminance analyzer 14 detects the luminance of each individual region R based on the information (image data) acquired from the imager 12. The luminance analyzer 14 is a high speed analyzer that outputs the analysis result at high speed. The luminance analyzer 14 of the present embodiment detects the luminance of each individual region R based on the information acquired from the high speed camera 36. The luminance analyzer 14 may detect the luminance of each individual region R every 0.1-5 ms, for example. The detection result from the luminance analyzer 14, i.e., a signal indicating luminance information of each individual region R, is transmitted to the lamp controller 18.

The lamp controller 18 sets an illuminance value of light emitted to each individual region R. As an example, the lamp controller 18 includes an illuminance setting unit 42. Based on the detection result from the luminance analyzer 14, the illuminance setting unit 42 determines the illuminance value of light emitted to each individual region R. The illuminance setting unit 42 uses different functions to determine the illuminance value for an individual region R that falls within a predetermined first luminance range, and the illuminance value for an individual region R that falls within a predetermined second luminance range. Also, for an individual region R falling within the first luminance range, the illuminance setting unit 42 of the present embodiment sets the illuminance value based on the luminance detected by the luminance analyzer 14. On the other hand, for an individual region R falling within the second luminance range, the illuminance setting unit 42 sets the illuminance value irrespective of the luminance detected by the luminance analyzer 14.

FIGS. 4A-4D are diagrams that each show relationships between a detected luminance value and a set illuminance value in the first embodiment. With regard to the detected luminance value, the illuminance setting unit 42 retains a predetermined first threshold T1, and a second threshold T2 larger than the first threshold T1, as shown in FIGS. 4A-4D. The illuminance setting unit 42 defines a luminance range from a minimum detected luminance value (zero, for example) to the first threshold T1 as a low luminance range L1. Also, the illuminance setting unit 42 defines a luminance range from the first threshold T1 to the second threshold T2 as a middle luminance range L2. Further, the illuminance setting unit 42 defines a luminance range from the second threshold T2 to a maximum detected luminance value (255, for example) as a high luminance range L3.

In the present embodiment, the low luminance range L1 corresponds to the first luminance range, the middle luminance range L2 corresponds to the second luminance range, and the high luminance range L3 corresponds to a third luminance range, which will be described later. Accordingly, in the present embodiment, the first luminance range is a range that includes luminances lower than those in the second luminance range. The gradation of the detected luminance value is not limited to 8-bit gradation (256 gradations) and may be 10-bit or 6-bit gradation, for example. Also, the first threshold T1 and the second threshold T2 may be appropriately determined by the designer based on experiments and simulations. Further, the number into which the luminance range is divided is not limited to three, and may be two or four or greater, for example.

In the function used to determine the illuminance value for an individual region R falling within the low luminance range L1, the illuminance value for an individual region R falling within the low luminance range L1 has a positive correlation with the luminance. Accordingly, in the low luminance range L1, a larger detected luminance value leads to a larger set illuminance value. In other words, the illuminance setting unit 42 produces a high contrast light distribution pattern for an individual region R falling within the low luminance range L1. A high contrast light distribution pattern is obtained by setting a relatively low illuminance value for an individual region R of which the detected luminance is relatively low, and setting a relatively high illuminance value for an individual region R of which the detected luminance is relatively high.

More specifically, the high contrast light distribution patterns are light distribution patterns with which, among the individual regions R falling within the low luminance range L1, bright individual regions R become brighter, and dark individual regions R become darker. The high contrast light distribution patterns highlight the contrast between brightness and darkness of an object illuminated by the light in front of the subject vehicle. This enables a driver to visually recognize a target present in front of the subject vehicle more easily. The target may be an oncoming vehicle, a pedestrian, a preceding vehicle, an obstacle that may interfere with the traveling of the subject vehicle, a traffic sign, a traffic marking, or a road shape, for example.

Figure 4A:
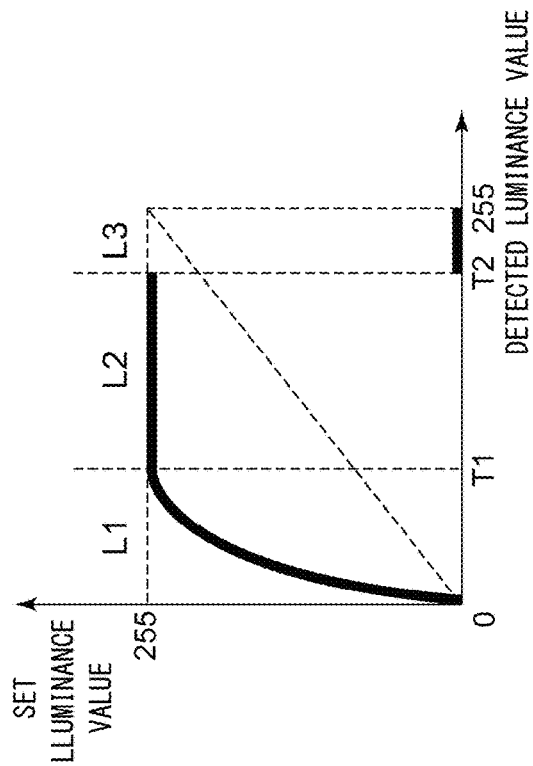
FIGS. 4A-4D are diagrams that each show relationships between a detected luminance value and a set illuminance value in the first embodiment.
Figure 4C:
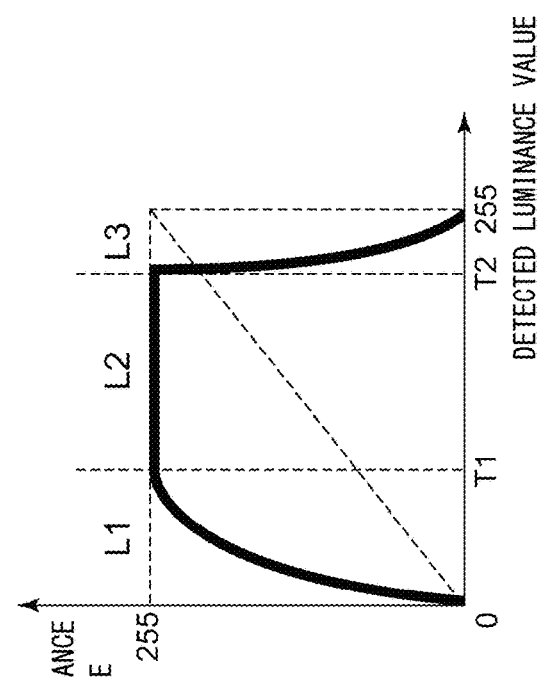
Figure 4B:
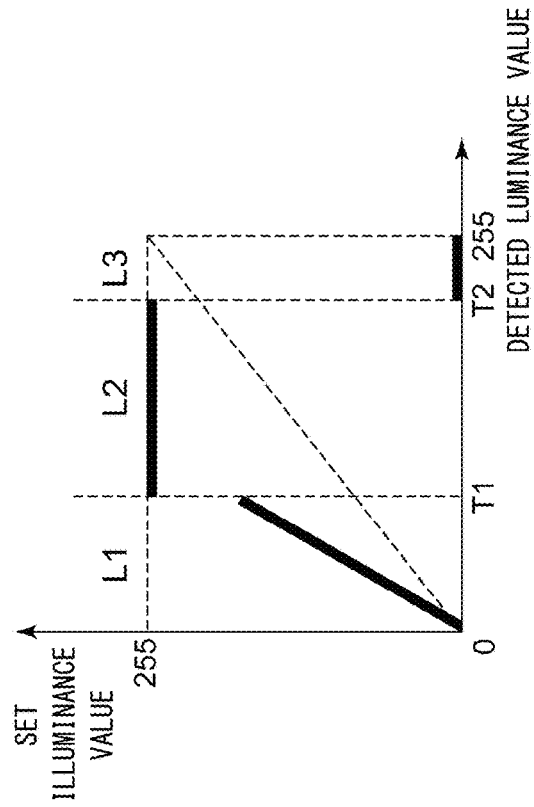

In the examples shown in FIGS. 4A and 4B, the illuminance setting unit 42 multiplies a detected luminance value falling within the low luminance range L1 by a constant gain value to set the illuminance value. Accordingly, the set illuminance value linearly increases as the detected luminance value increases. Also, the illuminance value is set such that the tone thereof is higher than that of the detected luminance value. In the example shown in FIG. 4A, the increment in illuminance value (the gradient of the straight line) is kept relatively smaller, and the illuminance value is discontinuous at the boundary between the low luminance range L1 and the middle luminance range L2. In the example shown in FIG. 4B, on the other hand, the increment in illuminance value is larger than that in the example shown in FIG. 4A, and the illuminance value is continuous at the boundary between the low luminance range L1 and the middle luminance range L2.

Discontinuous illuminance values allow greater flexibility in illuminance value setting. Meanwhile, continuous illuminance values reduce flexibility in illuminance value setting but can reduce incongruity that may be given to the driver by abrupt changes in illuminance value. Whether or not to make the illuminance value continuous at the boundary between the low luminance range L1 and the middle luminance range L2 may be appropriately determined by the designer based on experiments and simulations.

Figure 4D:
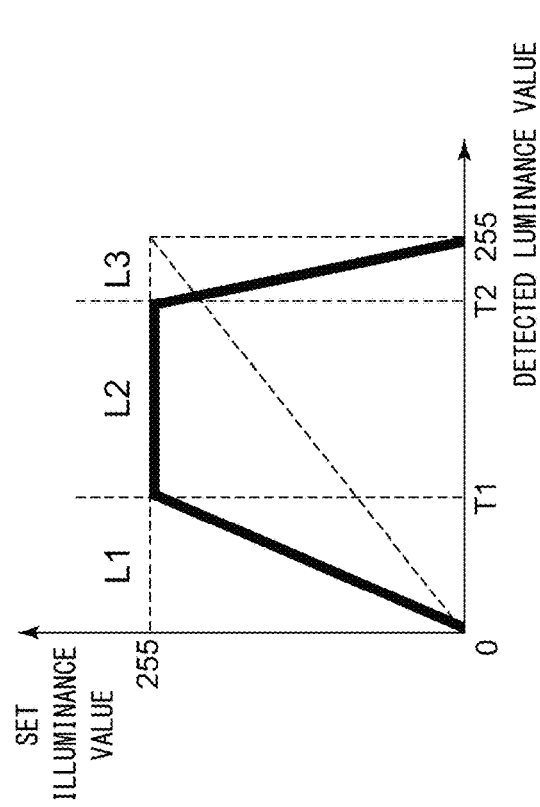

In the examples shown in FIGS. 4C and 4D, the illuminance setting unit 42 multiplies a detected luminance value falling within the low luminance range L1 by a predetermined gain value to set the illuminance value such that the set illuminance value nonlinearly increases. Although the set illuminance values in FIGS. 4C and 4D have non-linear characteristics forming an upward convex, the set illuminance values may have non-linear characteristics forming a downward convex. Also, although the illuminance value is continuous at the boundary between the low luminance range L1 and the middle luminance range L2 in the examples shown in FIGS. 4C and 4D, the illuminance value may be discontinuous at the boundary, similarly to the example shown in FIG. 4A.

For an individual region R falling within the middle luminance range L2, the illuminance setting unit 42 sets a constant illuminance value. In the present embodiment, the maximum illuminance value of light emitted by the light source unit 10 is set for an individual region R falling within the middle luminance range L2.

For an individual region R falling within a predetermined third luminance range, i.e., the high luminance range L3, which includes luminances higher than those in the low luminance range L1 and the middle luminance range L2, the illuminance setting unit 42 sets the illuminance value based on the luminance detected by the luminance analyzer 14 such that the illuminance value has a negative correlation with the luminance, or the illuminance setting unit 42 sets the illuminance value to zero irrespective of the luminance detected by the luminance analyzer 14. The high luminance range L3 is a range including the luminance of an individual region R in which a light emitter, such as a headlamp of an oncoming vehicle and a street light, is present. Accordingly, the second threshold T2 is a value less than the luminance of a light emitter.

In the examples shown in FIGS. 4A and 4C, the illuminance value is set to zero in the high luminance range L3.

Accordingly, an individual region R falling within the high luminance range L3 is shaded from light. Also, the illuminance value is discontinuous at the boundary between the middle luminance range L2 and the high luminance range L3. Meanwhile, in the examples shown in FIGS. 4B and 4D, the illuminance value is set based on the detected luminance such that the illuminance value has a negative correlation with the luminance. Also, the illuminance value is continuous at the boundary between the middle luminance range L2 and the high luminance range L3. In the example shown in FIG. 4B, the set illuminance value linearly decreases as the detected luminance value increases. Also, in the example shown in FIG. 4D, the set illuminance value nonlinearly decreases as the detected luminance value increases. Although the set illuminance value in FIG. 4D has non-linear characteristics forming a downward convex, the set illuminance value may have non-linear characteristics forming an upward convex. Also, in FIGS. 4B and 4D, while the detected luminance value and the set illuminance value are made to have a negative correlation, the illuminance value may be made discontinuous at the boundary between the middle luminance range L2 and the high luminance range L3.

Although the illuminance value is set to zero when the detected luminance value is zero in FIGS. 4A-4D, the configuration is not particularly limited thereto. For example, the illuminance value may be set to greater than zero when the detected luminance value is zero. In this case, when a high contrast light distribution pattern is produced, an individual region R of which the detected luminance is relatively low is illuminated by a certain amount of light. As a result, visibility of such an individual region R from the driver can be improved.

The illuminance setting unit 42 transmits a signal indicating the illuminance value for each individual region R to the light source controller 20. The illuminance setting unit 42 may set the illuminance value every 0.1-5 ms, for example. The light source controller 20 controls the light source unit 10 based on the illuminance values determined at the illuminance setting unit 42. The light source controller 20 controls turning on and off of the light source 22 and switching between on and off states of each mirror element 30. Based on the illuminance value of light emitted to each individual region R, the light source controller 20 adjusts the on-time ratio (width or density) of each mirror element 30. Accordingly, the illuminance of light emitted to each individual region R can be independently adjusted. Consequently, multiple partial illuminated regions are gathered to configure each of various light distribution patterns. The light source controller 20 may transmit a drive signal to at least one of the light source 22 and the optical deflection device 26 every 0.1-5 ms, for example.

The high contrast light distribution patterns as described above can be used for the adaptive driving beam (ADB) control for producing an optimum light distribution pattern based on the position of a specific target present in front of the subject vehicle. Specifically, as shown in FIG. 1, the imager 12 includes a low speed camera 38. The low speed camera 38 has a relatively low frame rate, which may be in the range from 30 fps to 120 fps inclusive (about 8-33 ms per frame), for example. Also, the low speed camera 38 has relatively high resolution, which may be 5,000,000 pixels or greater, for example. The low speed camera 38 captures an image of all the individual regions R. The low speed camera 38 captures an image in a state where a high contrast light distribution pattern is produced. The resolution of the high speed camera 36 and the low speed camera 38 is not limited to the aforementioned values, and may be set to arbitrary values within a range that is technically consistent.

The control device 50 includes a condition analyzer 16. The condition analyzer 16 detects a condition in front of the subject vehicle based on the information acquired from the imager 12. For example, the condition analyzer 16 detects a target present in front of the subject vehicle. The condition analyzer 16 is a low speed high-accuracy analyzer that performs highly accurate image analysis, compared to the luminance analyzer 14, and outputs the analysis result at low speed. The condition analyzer 16 of the present embodiment detects a condition in front of the subject vehicle based on the information acquired from the low speed camera 38. The image data from the low speed camera 38 is information acquired in a state where a high contrast light distribution pattern is produced. Accordingly, the condition analyzer 16 can detect a target more accurately in a region where a high contrast light distribution pattern is produced. The condition analyzer 16 may detect a condition every 50 ms, for example. The target detected by the condition analyzer 16 may be an oncoming vehicle 100 or a pedestrian 200 as shown in FIG. 3, for example.

The condition analyzer 16 may detect a target using a conventionally well-known method, including algorithm recognition and deep learning. For example, the condition analyzer 16 may retain a feature point indicating the pedestrian 200 in advance. Accordingly, when there is data that includes the feature point indicating the pedestrian 200 in the captured image data from the low speed camera 38, the condition analyzer 16 recognizes the position of the pedestrian 200. The detection result from the condition analyzer 16, i.e., a signal indicating information of a target in front of the subject vehicle, is transmitted to the lamp controller 18.

The lamp controller 18 includes a tracking unit 40. The tracking unit 40 determines a specific target among the targets detected by the condition analyzer 16. Also, the tracking unit 40 detects displacement of the specific target based on the detection result from the luminance analyzer 14. In the present embodiment, the pedestrian 200 is set as the specific target, as an example.

More specifically, the tracking unit 40 integrates the detection result from the luminance analyzer 14 with the detection result from the condition analyzer 16. Among the luminances of the individual regions R detected by the luminance analyzer 14, the luminance of the individual region R in which the pedestrian 200 as the specific target is positioned is related to the pedestrian 200. Upon recognition of the position of the luminance related to the pedestrian 200 in the detection result acquired thereafter from the luminance analyzer 14, the tracking unit 40 can detect displacement of the pedestrian 200 as the specific target. By performing publicly-known image processing, such as edge enhancement, on the luminance data of each individual region R as the detection result from the luminance analyzer 14, the tracking unit 40 can track the position of the pedestrian 200 more certainly. The edge enhancement may be included in the processing performed by the luminance analyzer 14.

The tracking unit 40 may perform processing for determining the specific target every 50 ms, for example. The tracking unit 40 may also perform processing (tracking) for detecting displacement of the specific target every 0.1-5 ms, for example.

Based on the detection result from the luminance analyzer 14 and the detection result from the tracking unit 40, the illuminance setting unit 42 determines the illuminance value of light emitted to each individual region R. Among the individual regions R, a specific individual region R1 is determined based on the position at which the specific target is present, and a specific illuminance value is determined for the specific individual region R1. More specifically, the illuminance setting unit 42 starts with determination of the specific individual region R1 based on the position at which the pedestrian 200 as the specific target is present.

The illuminance setting unit 42 then determines the specific illuminance value for the specific individual region R1. For example, as the specific illuminance value, the maximum illuminance value of light emitted by the light source unit 10 may be set. Accordingly, the pedestrian 200 is illuminated by light with a higher illuminance, so that the driver of the subject vehicle can visually recognize the pedestrian 200 more easily. In this case, the individual region R in which the face of the pedestrian 200 is positioned may desirably be shaded from light.

Also, for each of the individual regions R other than the specific individual region R1, the illuminance setting unit 42 produces a predetermined light distribution pattern based on the relationships between the detected luminance value and the set illuminance value shown in FIGS. 4A-4D. The illuminance setting unit 42 also recognizes displacement of the specific individual region R1 based on the detection result from the tracking unit 40 and updates the position information of the specific individual region R1. The illuminance setting unit 42 then also updates the illuminance value of light emitted to each individual region R. The process at the tracking unit 40 and the process at the illuminance setting unit 42 are performed in parallel at least at one point in time.

FIGS. 5A and 5B are flowcharts that each show an example of ADB control performed in the vehicular lamp system according to the first embodiment. In each of the flowcharts, when an instruction to perform ADB control is provided by means of a light switch or the like, not illustrated, and, in addition, the ignition switch has been turned on, the processing is repeatedly performed at predetermined timing; when the instruction to perform ADB control is cancelled (or a stop instruction is provided) or when the ignition switch is turned off, the processing terminates. The flowchart of FIG. 5A shows high speed processing repeated every 0.1-5 ms, for example, and the flowchart of FIG. 5B shows low speed processing repeated every 50 ms, for example. The low speed processing is performed in parallel with the high speed processing. Also, it is designed in advance that a first light distribution pattern is produced in the high speed processing at timing in synchronization with the timing at which the low speed processing is performed.

As shown in FIG. 5A, in the high speed processing, the high speed camera 36 captures an image of an area in front of the subject vehicle (S101). Based on the image data from the high speed camera 36, the luminance analyzer 14 detects the luminance of each individual region R (S102). Subsequently, it is judged if the specific individual region R1 has been set (S103). The judgement may be performed at the tracking unit 40, for example. When the specific individual region R1 has been set (Y at S103), the tracking unit 40 tracks the specific target to detect the position (displacement) of the specific individual region R1. Based on the detection result from the tracking unit 40, the illuminance setting unit 42 updates the setting (position information) of the specific individual region R1 (S104).

The illuminance setting unit 42 then sets the illuminance value of light emitted to each individual region R (S105). For the specific individual region R1, the specific illuminance value is set. For each of the rest of the individual regions R, the illuminance value is set based on the relationships between the detected luminance value and the set illuminance value shown in FIGS. 4A-4D. Thereafter, the light source controller 20 drives the light source unit 10, which then emits light with a determined illuminance (S106), and the routine is terminated. When the specific individual region R1 has not been set (N at S103), the illuminance setting unit 42 sets the illuminance value of light emitted to each individual region R (S105). In this case, the specific illuminance value is not included in the set illuminance values. Thereafter, the processing of the step S106 is performed, and the routine is terminated.

In the step S104, when disappearance of the specific target is detected in the tracking, the setting of the specific individual region R1 is also removed. Accordingly, the specific illuminance value is not included in the illuminance values set in the step S105. Also, in the step S103 of the next routine, it is judged that the specific individual region R1 has not been set (N at S103), until the processing of the step S205, which will be described later, is performed.

As shown in FIG. 5B, in the low speed processing, the low speed camera 38 captures an image of an area in front of the subject vehicle (S201). Based on the image data from the low speed camera 38, the condition analyzer 16 detects a target present in front of the subject vehicle (S202). Thereafter, it is judged if the specific target is included in the detected targets (S203). The judgement may be performed at the tracking unit 40.

When the specific target is included (Y at S203), the tracking unit 40 determines the specific target (S204). Thereafter, the illuminance setting unit 42 sets the specific individual region R1 based on the position at which the specific target is present (S205), and the routine is terminated. When the specific target is not included (N at S203), the routine is terminated. Although the specific individual region is set in the low speed processing in the abovementioned flowcharts, such setting may be performed in the high speed processing.

As described above, the vehicular lamp system 1 according to the present embodiment includes the imager 12, luminance analyzer 14, illuminance setting unit 42, light source unit 10, and light source controller 20. Based on the information acquired from the imager 12, the luminance analyzer 14 detects the luminance of each of multiple individual regions R arranged in front of the subject vehicle. Based on the detection result from the luminance analyzer 14, the illuminance setting unit 42 determines the illuminance value of light emitted to each individual region R. The illuminance setting unit 42 uses different functions to determine the illuminance value for an individual region R that falls within the predetermined first luminance range, and the illuminance value for an individual region R that falls within the predetermined second luminance range. The light source controller 20 controls the light source unit 10 based on the illuminance values determined at the illuminance setting unit 42.

In this way, the individual regions R arranged in front of the subject vehicle are divided into multiple luminance ranges, and the relationships between the detected luminance value and the set illuminance value are made different for each luminance range, thereby increasing the types of light distribution patterns produced by the vehicular lamp system 1. Accordingly, light distribution patterns can be produced more appropriately based on the condition in front of the subject vehicle, so that the safety of driving can be improved.

Also, the illuminance setting unit 42 sets the illuminance value for an individual region R falling within the first luminance range based on the detected luminance, and sets the illuminance value for an individual region R falling within the second luminance range irrespective of the detected luminance. Accordingly, with regard to the second luminance range, processing for calculating the illuminance value from the detected luminance is unnecessary. Therefore, the load on the illuminance setting unit 42 can be reduced.

Also, in the present embodiment, the first luminance range includes luminances lower than those in the second luminance range. In other words, the first luminance range corresponds to the low luminance range L1, and the second luminance range corresponds to the middle luminance range L2. Accordingly, the illuminance value for an individual region R falling within the low luminance range L1 is set based on the detected luminance. Also, the illuminance value for an individual region R falling within the first luminance range has a positive correlation with the luminance. More specifically, for a dark individual region R, a high contrast light distribution pattern, by which the contrast between brightness and darkness of an object illuminated by the light is highlighted, is produced. Accordingly, a target present in front of the subject vehicle can be visually recognized more easily.

For an individual region R falling within the high luminance range L3, the illuminance setting unit 42 sets the illuminance value based on the detected luminance such that the illuminance value has a negative correlation with the luminance, or the illuminance setting unit 42 sets the illuminance value to zero irrespective of the detected luminance. Accordingly, light irradiation to a light emitter, such as a headlamp of an oncoming vehicle and a street light, can be avoided. As a result, power consumption of the vehicular lamp system 1 can be reduced.

Second Embodiment

The vehicular lamp system according to the second embodiment has a configuration in common with the vehicular lamp system according to the first embodiment, except that the method of setting the illuminance value by the illuminance setting unit 42 is different. In the following, the vehicular lamp system according to the second embodiment will be described mainly for configurations different from those in the first embodiment, and description of configurations in common will be briefly given or may be omitted.

As with the vehicular lamp system 1 according to the first embodiment, the vehicular lamp system 1 according to the second embodiment includes the imager 12, luminance analyzer 14, illuminance setting unit 42, light source unit 10, and light source controller 20 (see FIG. 1).

Based on the detection result from the luminance analyzer 14, the illuminance setting unit 42 determines the illuminance value of light emitted to each individual region R. The illuminance setting unit 42 uses different functions to determine the illuminance value for an individual region R that falls within the predetermined first luminance range, and the illuminance value for an individual region R that falls within the predetermined second luminance range. Further, for each of an individual region R falling within the first luminance range and an individual region R falling within the second luminance range, the illuminance setting unit 42 of the present embodiment sets the illuminance value based on the luminance detected by the luminance analyzer 14. However, the correspondence relationship between the detected luminance and the set illuminance is set differently for each of the first luminance range and the second luminance range.

Figure 6A:
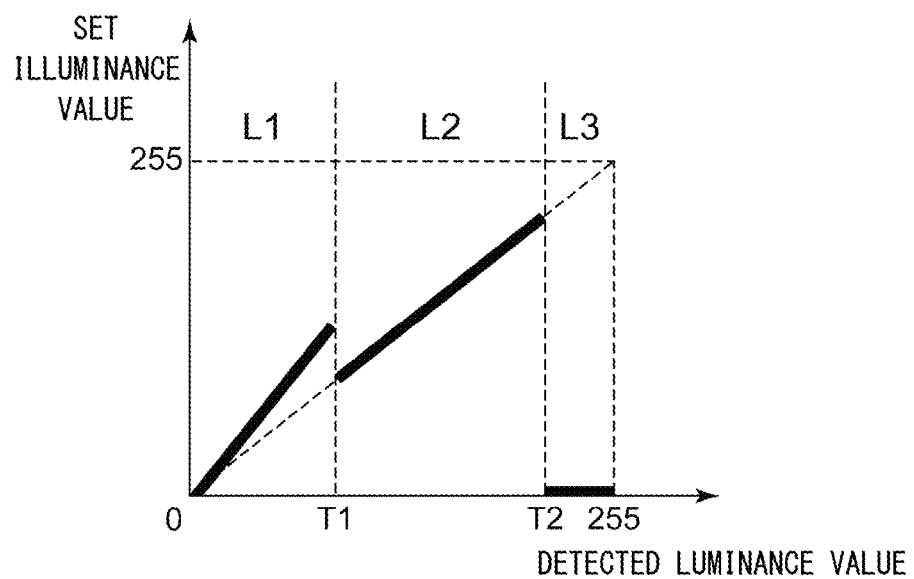
FIGS. 6A and 6B are diagrams that each show relationships between the detected luminance value and the set illuminance value in a second embodiment.
Figure 6B:
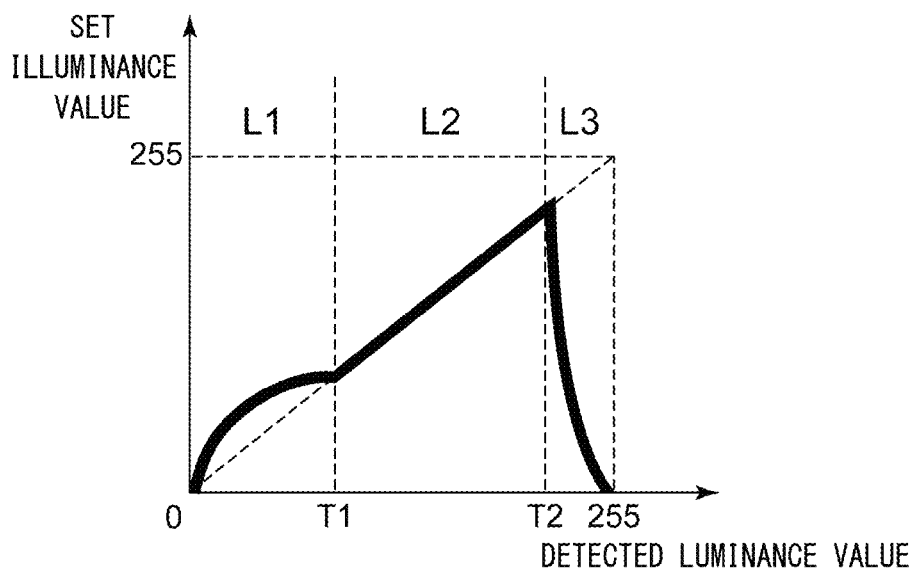

FIGS. 6A and 6B are diagrams that each show relationships between the detected luminance value and the set illuminance value in the second embodiment. With regard to the detected luminance value, the illuminance setting unit 42 retains the first threshold T1 and the second threshold T2, as shown in FIGS. 6A and 6B. The illuminance setting unit 42 defines a luminance range from a minimum detected luminance value (zero, for example) to the first threshold T1 as the low luminance range L1. Also, the illuminance setting unit 42 defines a luminance range from the first threshold T1 to the second threshold T2 as the middle luminance range L2. Further, the illuminance setting unit 42 defines a luminance range from the second threshold T2 to a maximum detected luminance value (255, for example) as the high luminance range L3. In the present embodiment, the low luminance range L1 corresponds to the first luminance range, the middle luminance range L2 corresponds to the second luminance range, and the high luminance range L3 corresponds to the third luminance range.

In the function used for an individual region R falling within the low luminance range L1, the illuminance value for an individual region R falling within the low luminance range L1 has a positive correlation with the luminance. Also, in the function used for an individual region R falling within the middle luminance range L2, the illuminance value for an individual region R falling within the middle luminance range L2 also has a positive correlation with the luminance. Accordingly, in each of the low luminance range L1 and the middle luminance range L2, a larger detected luminance value leads to a larger set illuminance value. In other words, the illuminance setting unit 42 produces a high contrast light distribution pattern for each of individual regions R falling within the low luminance range L1 and individual regions R falling within the middle luminance range L2.

In at least part of the low luminance range L1, the illuminance value is set such that the tone thereof is higher than that of the detected luminance value. Meanwhile, in the middle luminance range L2, the illuminance value is set such that the tone thereof is identical with that of the detected luminance value. Accordingly, in the low luminance range L1, a high contrast light distribution pattern, by which the contrast between brightness and darkness of an object illuminated by the light is further highlighted, is produced.

In the example shown in FIG. 6A, the set illuminance value linearly increases as the detected luminance value increases. Also, the illuminance value is discontinuous at the boundary between the low luminance range L1 and the middle luminance range L2. Meanwhile, in the example shown in FIG. 6B, the set illuminance value nonlinearly increases as the detected luminance value increases. Also, the illuminance value is continuous at the boundary between the low luminance range L1 and the middle luminance range L2. Although the set illuminance value within the low luminance range L1 in FIG. 6B has non-linear characteristics forming an upward convex, the set illuminance value may have non-linear characteristics forming a downward convex. Also, the illuminance value may be discontinuous at the boundary between the low luminance range L1 and the middle luminance range L2, similarly to the example shown in FIG. 6A.

For an individual region R falling within the predetermined third luminance range, i.e., the high luminance range L3, which includes luminances higher than those in the low luminance range L1 and the middle luminance range L2, the illuminance setting unit 42 sets the illuminance value based on the luminance detected by the luminance analyzer 14 such that the illuminance value has a negative correlation with the luminance, or the illuminance setting unit 42 sets the illuminance value to zero irrespective of the luminance detected by the luminance analyzer 14.

In the example shown in FIG. 6A, the illuminance value is set to zero in the high luminance range L3. Accordingly, an individual region R falling within the high luminance range L3 is shaded from light. Also, the illuminance value is discontinuous at the boundary between the middle luminance range L2 and the high luminance range L3. Meanwhile, in the example shown in FIG. 6B, the illuminance value is set based on the detected luminance such that the illuminance value has a negative correlation with the luminance. Also, the illuminance value is continuous at the boundary between the middle luminance range L2 and the high luminance range L3. Although the set illuminance value in the example shown in FIG. 6B has non-linear characteristics forming a downward convex, the set illuminance value may have non-linear characteristics forming an upward convex. Also, although the set illuminance value nonlinearly decreases as the detected luminance value increases, the set illuminance value may linearly decreases. Further, the illuminance value may be discontinuous at the boundary between the middle luminance range L2 and the high luminance range L3.

Although the illuminance value is set to zero when the detected luminance value is zero in FIGS. 6A and 6B, the configuration is not particularly limited thereto. For example, the illuminance value may be set to greater than zero when the detected luminance value is zero.

Also with the vehicular lamp system 1 according to the present embodiment, the types of producible light distribution patterns can be increased. Accordingly, light distribution patterns can be produced more appropriately based on the condition in front of the subject vehicle, so that the safety of driving can be improved. Also, the illuminance setting unit 42 of the present embodiment sets the illuminance value for an individual region R falling within each of the first luminance range and the second luminance range based on the detected luminance, and the correspondence relationship between the detected luminance and the set illuminance is set differently for each of the luminance ranges. Further, each of the illuminance value for an individual region R falling within the first luminance range and the illuminance value for an individual region R falling within the second luminance range has a positive correlation with the luminance. Accordingly, visibility, from the driver, of an object illuminated by the light can be improved in a wider luminance range.

Third Embodiment

The vehicular lamp system according to the third embodiment has a configuration in common with the vehicular lamp system according to the first embodiment, except that the method of setting the illuminance value by the illuminance setting unit 42 is different. In the following, the vehicular lamp system according to the third embodiment will be described mainly for configurations different from those in the first embodiment, and description of configurations in common will be briefly given or may be omitted.

As with the vehicular lamp system 1 according to the first embodiment, the vehicular lamp system 1 according to the third embodiment includes the imager 12, luminance analyzer 14, illuminance setting unit 42, light source unit 10, and light source controller 20 (see FIG. 1).

Based on the detection result from the luminance analyzer 14, the illuminance setting unit 42 determines the illuminance value of light emitted to each individual region R. The illuminance setting unit 42 uses different functions to determine the illuminance value for an individual region R that falls within the predetermined first luminance range, and the illuminance value for an individual region R that falls within the predetermined second luminance range. Further, the illuminance setting unit 42 of the present embodiment sets the illuminance value for an individual region R falling within the first luminance range and an individual region R falling within the second luminance range, irrespective of the luminance detected by the luminance analyzer 14.

Figure 7A:
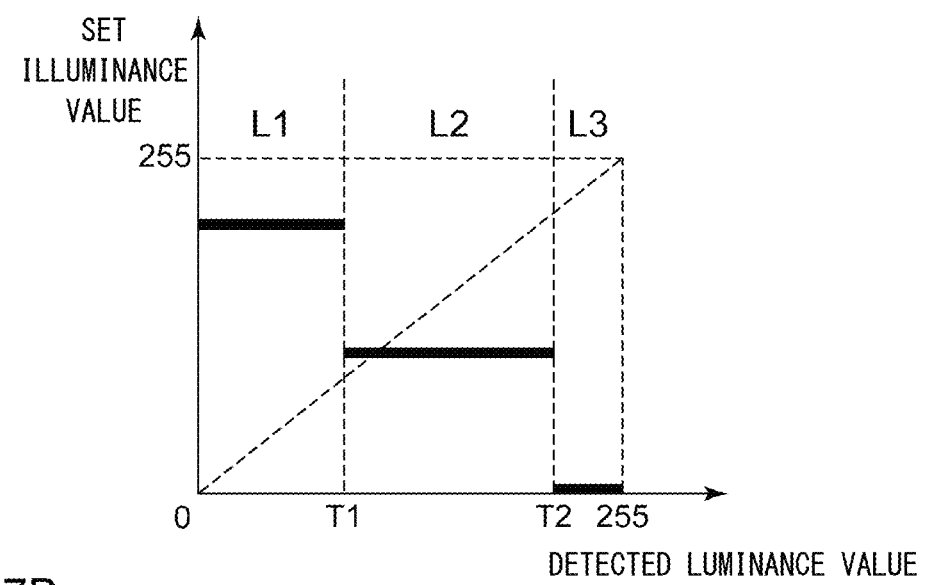
FIG. 7A is a diagram that shows relationships between the detected luminance value and the set illuminance value in a third embodiment.

FIG. 7A is a diagram that shows relationships between the detected luminance value and the set illuminance value in the third embodiment. With regard to the detected luminance value, the illuminance setting unit 42 retains the first threshold T1 and the second threshold T2, as shown in FIG. 7A. The illuminance setting unit 42 defines a luminance range from a minimum detected luminance value (zero, for example) to the first threshold T1 as the low luminance range L1. Also, the illuminance setting unit 42 defines a luminance range from the first threshold T1 to the second threshold T2 as the middle luminance range L2. Further, the illuminance setting unit 42 defines a luminance range from the second threshold T2 to a maximum detected luminance value (255, for example) as the high luminance range L3. In the present embodiment, the low luminance range L1 corresponds to the first luminance range, the middle luminance range L2 corresponds to the second luminance range, and the high luminance range L3 corresponds to the third luminance range.

For an individual region R falling within the low luminance range L1, the illuminance setting unit 42 sets a constant first illuminance value. Also, for an individual region R falling within the middle luminance range L2, the illuminance setting unit 42 sets a constant second illuminance value. In the present embodiment, the first illuminance value is higher than the second illuminance value.

Accordingly, when the integrated luminance range including the low luminance range L1 and the middle luminance range L2 is observed, it is found that the illuminance setting unit 42 sets a relatively high illuminance value for an individual region R of which the detected luminance is relatively low, and sets a relatively low illuminance value for an individual region R of which the detected luminance is relatively high. As a result, a luminance equalization light distribution pattern for equalizing the brightness in front of the subject vehicle is produced. With the luminance equalization light distribution pattern, a target present in a dark region in front of the subject vehicle can be brightly illuminated. Therefore, with a method or in a mode different from that of a high contrast light distribution pattern, visibility of a target present in front of the subject vehicle can be improved.

In the example shown in FIG. 7A, the illuminance setting unit 42 sets a relatively high illuminance value for an individual region R falling within the low luminance range L1, and sets a relatively low illuminance value for an individual region R falling within the middle luminance range L2. However, the configuration is not particularly limited thereto, and a relatively low illuminance value may be set for an individual region R falling within the low luminance range L1, and a relatively high illuminance value may be set for an individual region R falling within the middle luminance range L2. In this case, when the integrated luminance range including the low luminance range L1 and the middle luminance range L2 is observed, it is found that a high contrast light distribution pattern is produced.

For an individual region R falling within the high luminance range L3, the illuminance setting unit 42 sets the illuminance value to zero irrespective of the detected luminance. The illuminance setting unit 42 may also set the illuminance value based on the detected luminance such that the illuminance value has a negative correlation with the luminance. In this case, the set illuminance value may linearly decrease or may nonlinearly decrease. Also, the illuminance value at the boundary between the middle luminance range L2 and the high luminance range L3 may be continuous, or may be discontinuous. Further, when the set illuminance value nonlinearly decreases, the set illuminance value may have non-linear characteristics forming an upward convex, or may have non-linear characteristics forming a downward convex.

Although the illuminance value is set to zero when the detected luminance value is zero in FIG. 7A, the configuration is not particularly limited thereto. For example, the illuminance value may be set to greater than zero when the detected luminance value is zero.

Fourth Embodiment

The vehicular lamp system according to the fourth embodiment has a configuration in common with the vehicular lamp system according to the first embodiment, except that the method of setting the illuminance value by the illuminance setting unit 42 is different. In the following, the vehicular lamp system according to the fourth embodiment will be described mainly for configurations different from those in the first embodiment, and description of configurations in common will be briefly given or may be omitted.

As with the vehicular lamp system 1 according to the first embodiment, the vehicular lamp system 1 according to the fourth embodiment includes the imager 12, luminance analyzer 14, illuminance setting unit 42, light source unit 10, and light source controller 20 (see FIG. 1).

Based on the detection result from the luminance analyzer 14, the illuminance setting unit 42 determines the illuminance value of light emitted to each individual region R. The illuminance setting unit 42 uses different functions to determine the illuminance value for an individual region R that falls within the predetermined first luminance range, and the illuminance value for an individual region R that falls within the predetermined second luminance range. Also, the illuminance setting unit 42 of the present embodiment sets the illuminance value for an individual region R falling within the first luminance range based on the detected luminance. On the other hand, the illuminance setting unit 42 sets the illuminance value for an individual region R falling within the second luminance range irrespective of the detected luminance.

Figure 7B:
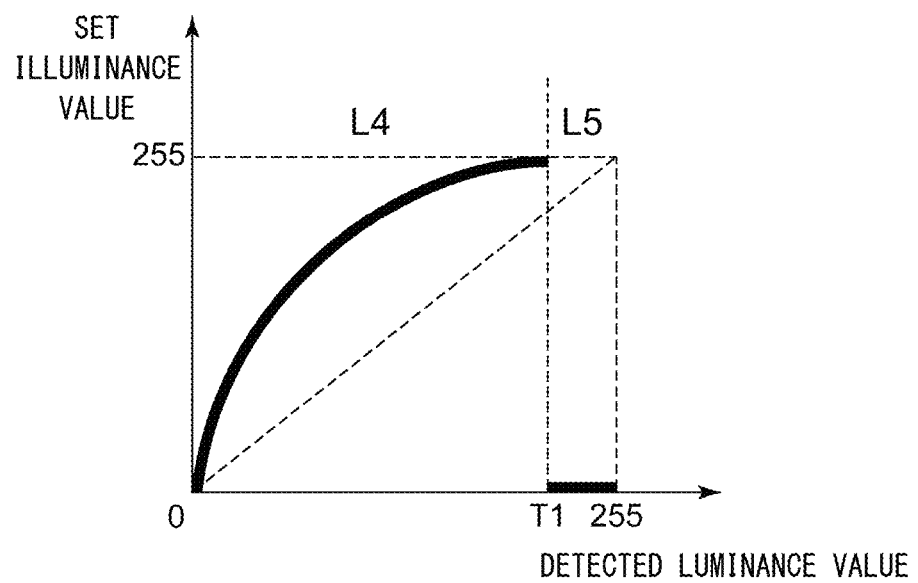
FIG. 7B is a diagram that shows relationships between the detected luminance value and the set illuminance value in a fourth embodiment.

FIG. 7B is a diagram that shows relationships between the detected luminance value and the set illuminance value in the fourth embodiment. With regard to the detected luminance value, the illuminance setting unit 42 retains the first threshold T1, as shown in FIG. 7B. The illuminance setting unit 42 defines a luminance range from a minimum detected luminance value (zero, for example) to the first threshold T1 as a low luminance range L4. Also, the illuminance setting unit 42 defines a luminance range from the first threshold T1 to a maximum detected luminance value (255, for example) as a high luminance range L5.

In the present embodiment, the illuminance setting unit 42 only sets the two luminance ranges of the low luminance range L4 and the high luminance range L5. The low luminance range L4 corresponds to the first luminance range, and the high luminance range L5 corresponds to the second luminance range. Also, the low luminance range L4 corresponds to the luminance range of the low luminance range L1 integrated with the middle luminance range L2 of the first through third embodiments. The high luminance range L5 corresponds to the high luminance range L3 of the first through third embodiments. Accordingly, the first threshold T1 in the present embodiment corresponds to the second threshold T2 in the first through third embodiments.

The illuminance setting unit 42 multiplies a detected luminance value falling within the low luminance range L4 by a predetermined gain value to set the illuminance value such that the set illuminance value nonlinearly increases. The illuminance value for an individual region R falling within the low luminance range L1 has a positive correlation with the luminance. Accordingly, in the low luminance range L4, a high contrast light distribution pattern is produced. Although the set illuminance value in FIG. 7B has non-linear characteristics forming an upward convex, the set illuminance value may have non-linear characteristics forming a downward convex. Also, the set illuminance value may linearly increase as the detected luminance value increases.

In the low luminance range L4, the illuminance value may have a negative correlation with the detected luminance. In this case, the set illuminance value may linearly decrease or may nonlinearly decrease. Also, when the set illuminance value nonlinearly decreases, the set illuminance value may have non-linear characteristics forming an upward convex, or may have non-linear characteristics forming a downward convex.

For an individual region R falling within the high luminance range L5, the illuminance setting unit 42 sets the illuminance value to zero irrespective of the detected luminance. The illuminance setting unit 42 may also set the illuminance value based on the detected luminance such that the illuminance value has a negative correlation with the luminance. In this case, the set illuminance value may linearly decrease, or may nonlinearly decrease. Also, the illuminance value at the boundary between the low luminance range L4 and the high luminance range L5 may be continuous, or may be discontinuous. Further, when the set illuminance value nonlinearly decreases, the set illuminance value may have non-linear characteristics forming an upward convex, or may have non-linear characteristics forming a downward convex.

Although the illuminance value is set to zero when the detected luminance value is zero in FIG. 7B, the configuration is not particularly limited thereto. For example, the illuminance value may be set to greater than zero when the detected luminance value is zero.

The present invention is not limited to the embodiments stated above. It is to be understood that combinations of the embodiments or various modifications, including design modifications, may be made based on the knowledge of those skilled in the art and that embodiments obtained by such combinations and modifications are also within the scope of the present invention. Such an additional embodiment has the effect of each of the combined embodiments and modifications.

Figure 8:
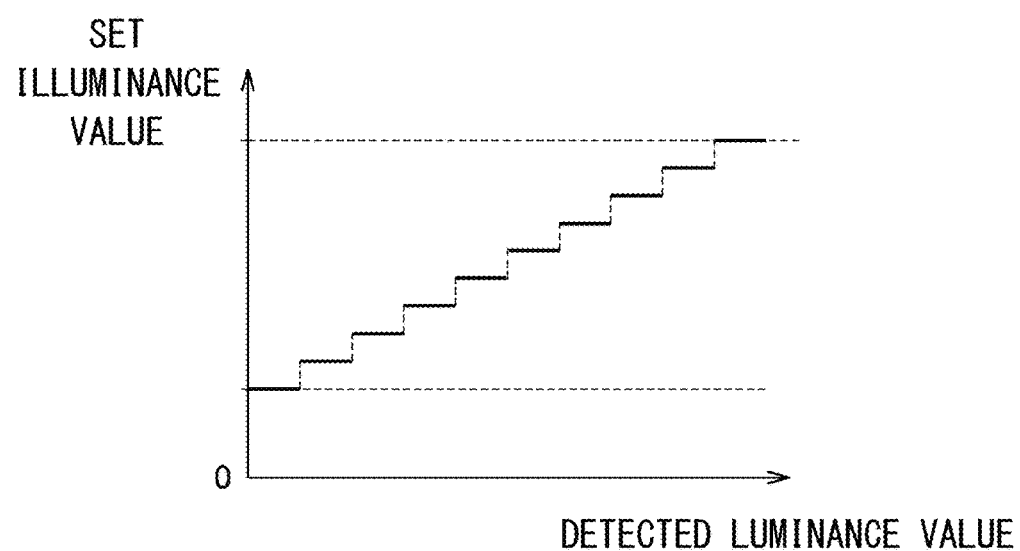
FIG. 8 is a diagram that shows relationships between the detected luminance value and the set illuminance value in a modification.

FIG. 8 is a diagram that shows relationships between the detected luminance value and the set illuminance value in a modification. In the low luminance range L1 in FIGS. 4A-4D, the low luminance range L1 in FIGS. 6A and 6B, and the low luminance range L4 in FIG. 7B, the set illuminance value continuously increases with respect to the detected luminance value. However, the configuration is not limited thereto, and, when the set illuminance value is increased based on the detected luminance value, the set illuminance value may be increased in steps with respect to the detected luminance value, as shown in FIG. 8. The number of steps for a change may be appropriately set. The same applies to the middle luminance range L2 in FIGS. 6A and 6B. Also when the set illuminance value is decreased with respect to the detected luminance value, the configuration is not limited to that in which the set illuminance value is continuously decreased, as shown in the high luminance range L3 in FIGS. 4B and 4D and in the high luminance range L3 in FIG. 6B, and the set illuminance value may be decreased in steps.

In each embodiment, although the imager 12, luminance analyzer 14, condition analyzer 16, lamp controller 18, and light source controller 20 are provided within the lamp chamber 8, each of the components may be provided outside the lamp chamber 8 as appropriate. For example, as the low speed camera 38 of the imager 12, an existing camera mounted within the vehicle cabin may be used. The viewing angle of the imager 12 may desirably be the same as that of the light source unit 10.

If the high speed camera 36 has resolution equivalent to that of the low speed camera 38, the low speed camera 38 may be omitted. This enables downsizing of the vehicular lamp system 1. In this case, the condition analyzer 16 detects a target using image data from the high speed camera 36.

The light source unit 10 may include, instead of the optical deflection device 26 which is a DMD, a scanning optical system for scanning an area in front of the subject vehicle using light from the light source, or an LED array in which LEDs corresponding to the respective individual regions R are arranged.

In the first embodiment, the illuminance value for an individual region R falling within the low luminance range L1 may be set irrespective of the detected luminance, and the illuminance value for an individual region R falling within the middle luminance range L2 may be set based on the detected luminance. In other words, the low luminance range L1 may correspond to the second luminance range, and the middle luminance range L2 may correspond to the first luminance range. Also, when it is determined that "different functions are used to determine the illuminance value for an individual region R that falls within the first luminance range, and the illuminance value for an individual region R that falls within the second luminance range", any one of the low luminance range L1, middle luminance range L2, and high luminance range L3 corresponds to the first luminance range, and another one of the ranges corresponds to the second luminance range.

The specific target in the ADB control may be the oncoming vehicle 100. In this case, the condition analyzer 16 retains a feature point indicating the oncoming vehicle 100 in advance. Accordingly, when there is data that includes the feature point indicating the oncoming vehicle 100 in the captured image data from the low speed camera 38, the condition analyzer 16 recognizes the position of the oncoming vehicle 100. The "feature point indicating the oncoming vehicle 100" may be a light spot 102 (see FIG. 3) that has predetermined luminous intensity or higher and that appears in a region where a headlamp of the oncoming vehicle 100 is presumed to be present, for example. The tracking unit 40 then relates the luminance of the individual region R in which the light spot 102 of the oncoming vehicle 100 as the specific target is positioned, to the oncoming vehicle 100.

The illuminance setting unit 42 determines the specific individual region R1 based on the position at which the oncoming vehicle 100 is present. For example, with respect to a horizontal distance a (see FIG. 3) between the two light spots 102 corresponding to the headlamps of the oncoming vehicle 100, the illuminance setting unit 42 may determine a vertical distance b having a predetermined ratio to the horizontal distance a, and may define, as the specific individual region R1, an individual region R overlapping with a range of which the lateral dimension is a and the longitudinal dimension is b. The specific individual region R1 includes the individual region R overlapping with the driver of the oncoming vehicle. The illuminance setting unit 42 sets zero, for example, as the specific illuminance value for the specific individual region R1. In other words, the specific individual region R1 is shaded from light.

The following aspects may also be included in the present invention.

A control device 50 for a vehicular lamp 2, the control device 50 comprising:

a luminance analyzer 14 that detects a luminance of each of a plurality of individual regions R arranged in front of the subject vehicle, on the basis of information acquired from an imager 12 that captures an image of an area in front of the subject vehicle;

an illuminance setting unit 42 that determines an illuminance value of light emitted to each individual region R, on the basis of a detection result from the luminance analyzer 14; and a light source controller 20 that controls a light source unit 10 that independently controls the illuminance of light emitted to each individual region R, on the basis of an illuminance value determined at the illuminance setting unit 42, wherein the illuminance setting unit 42 uses different functions to determine the illuminance value for an individual region R of which the luminance is included in a predetermined first range, and the illuminance value for an individual region R of which the luminance is included in a predetermined second range.

A control method for a vehicular lamp 2, the control method comprising:

detecting a luminance of each of a plurality of individual regions R arranged in front of the subject vehicle, on the basis of information acquired from an imager 12 that captures an image of an area in front of the subject vehicle;

determining an illuminance value of light emitted to each individual region R, on the basis of a detected luminance; and controlling a light source unit 10 that independently controls the illuminance of light emitted to each individual region R, on the basis of a determined illuminance value, wherein, in the determining an illuminance value, different functions are used to determine the illuminance value for an individual region R of which the luminance is included in a predetermined first range, and the illuminance value for an individual region R of which the luminance is included in a predetermined second range.

Fifth Embodiment

Figure 9:
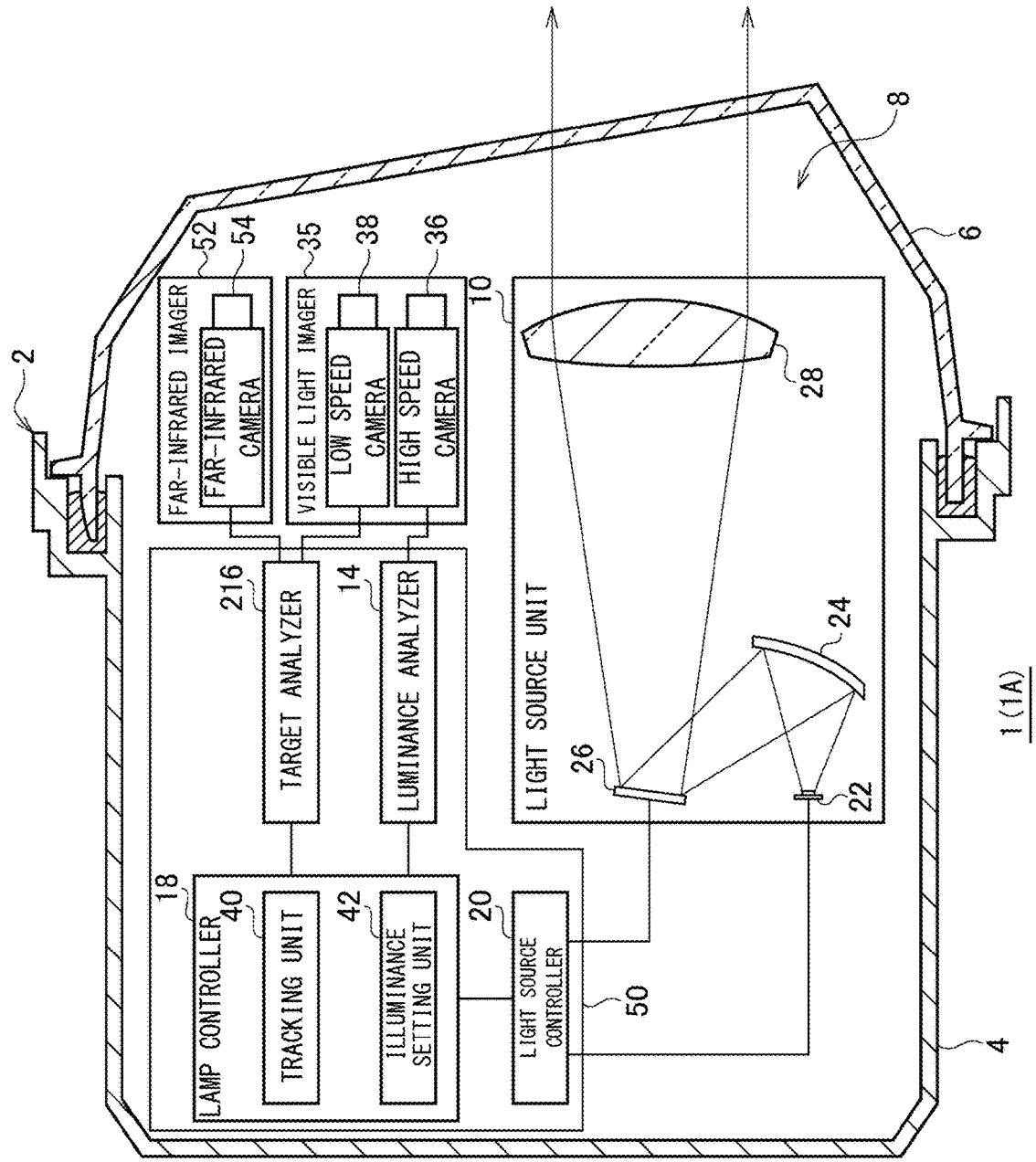
FIG. 9 is a diagram that shows a schematic configuration of a vehicular lamp system according to a fifth embodiment.

FIG. 9 is a diagram that shows a schematic configuration of a vehicular lamp system according to the fifth embodiment. In FIG. 9, part of the constituting elements of the vehicular lamp system 1 are illustrated as functional blocks. Each of the functional blocks may be implemented by an element such as a CPU or memory of a computer or by a circuit as a hardware configuration, and by a computer program or the like as a software configuration. It will be obvious to those skilled in the art that the functional blocks may be implemented in a variety of forms by combinations of hardware and software.

The vehicular lamp system 1(1A) may be applicable to a vehicular headlamp device provided with a pair of headlamp units disposed on the left and right sides of the front part of a vehicle. Since the pair of headlamp units have substantially the same configuration except that they have symmetrical structures, FIG. 9 shows the structure of one headlamp unit as a vehicular lamp 2.

The vehicular lamp 2 in the vehicular lamp system 1 includes a lamp body 4 having an opening part on the front side of the vehicle, and a translucent cover 6 attached to cover the opening part of the lamp body 4. The translucent cover 6 is made of resin, glass, or the like having translucency. The lamp body 4 and the translucent cover 6 form a lamp chamber 8, in which a light source unit 10, a visible light imager 35, a far-infrared imager 52, and a control device 50 are housed.

The light source unit 10 is a device that can independently control the illuminance (strength) of light emitted to each of multiple individual regions arranged in front of the subject vehicle (see FIG. 3). The light source unit 10 includes a light source 22, a reflective optical member 24, an optical deflection device 26, and a projective optical member 28. Each component is attached to the lamp body 4 by means of a support mechanism, which is not illustrated.

As the light source 22, a semiconductor light emitting element, such as a light emitting diode (an LED), a laser diode (an LD), and an electroluminescence (EL) element, a light bulb, an incandescent lamp (a halogen lamp), an electric-discharge lamp (a discharge lamp), or the like may be used.

The reflective optical member 24 is configured to lead the light emitted from the light source 22 to a reflecting surface of the optical deflection device 26. The reflective optical member 24 is constituted by a reflecting mirror of which the inner surface is a certain reflecting surface. The reflective optical member 24 may also be a solid light guide or the like. When the light emitted from the light source 22 can be directly led to the optical deflection device 26, the reflective optical member 24 need not necessarily be provided.

The optical deflection device 26 is disposed on an optical axis of the projective optical member 28 and configured to selectively reflect the light emitted from the light source 22 to the projective optical member 28. The optical deflection device 26 may be constituted by a digital mirror device (DMD), for example. More specifically, the optical deflection device 26 includes multiple micro mirrors arranged in an array (a matrix). By controlling the angle of the reflecting surface of each of the multiple micro mirrors, the reflecting direction of the light emitted from the light source 22 can be selectively changed. More specifically, the optical deflection device 26 can reflect part of the light emitted from the light source 22 toward the projective optical member 28, and also can reflect the rest of the light toward a direction in which the rest of the light will not be effectively used by the projective optical member 28. The direction in which the rest of the light will not be effectively used may be a direction in which the light will be incident on the projective optical member 28 but will hardly contribute to production of a light distribution pattern, or may be a direction toward a light absorbing member (light-shielding member), which is not illustrated.

FIG. 2A is a front view that shows a schematic configuration of the optical deflection device. FIG. 2B is a sectional view of the optical deflection device taken along line A-A of FIG. 2A. The optical deflection device 26 includes a micro mirror array 32 in which multiple micro mirror elements 30 are arranged in a matrix, and a transparent cover member 34 provided in front of reflecting surfaces 30a of the mirror elements 30 (on the right side of the optical deflection device 26 shown in FIG. 2B). The cover member 34 may be made of glass or plastic, for example.

Each mirror element 30 has a substantially square shape and includes a rotational shaft 30b that extends in a horizontal direction and nearly bisects the mirror element 30. Each mirror element 30 of the micro mirror array 32 is configured such that the position thereof can be switched between a first reflecting position (a position indicated by a solid line in FIG. 2B) at which the mirror element 30 reflects the light emitted from the light source 22 toward the projective optical member 28 such that the light will be used as part of a desired light distribution pattern, and a second reflecting position (a position indicated by a dotted line in FIG. 2B) at which the mirror element 30 reflects the light emitted from the light source 22 such that the light will not be effectively used. Each mirror element 30 rotates about the rotational shaft 30b, and the position of each mirror element 30 can be individually switched between the first reflecting position and the second reflecting position. The position of each mirror element 30 is set to the first reflecting position when the mirror element 30 is turned on, and set to the second reflecting position when the mirror element 30 is turned off.

FIG. 3 is a diagram that schematically shows a state of an area in front of the subject vehicle. As described previously, the light source unit 10 includes multiple mirror elements 30 as individual emission parts that each can independently emit light frontward of the lamp. By means of the mirror elements 30, the light source unit 10 can emit light to multiple individual regions R arranged in front of the subject vehicle. Each individual region R corresponds to one pixel or a group of multiple pixels for the visible light imager 35, more specifically a high speed camera 36, for example. In the present embodiment, the individual regions R are respectively related to the mirror elements 30.

Although each of FIGS. 2A and 3 shows the mirror elements 30 and the individual regions R as an array of 8 rows and 10 columns for the sake of convenience, the number of mirror elements 30 and individual regions R is not particularly limited. For example, the resolution of the micro mirror array 32 (in other words, the number of mirror elements 30 and individual regions R) may be 1,000-300,000 pixels. Meanwhile, the time it takes the light source unit 10 to produce one light distribution pattern may be 0.1-5 ms, for example. Therefore, the light source unit 10 can change the light distribution pattern every 0.1-5 ms.

As shown in FIG. 9, the projective optical member 28 may be constituted by a free-curved surface lens of which the front-side surface and the rear-side surface each have a free-curved surface shape, for example. The projective optical member 28 projects a light source image formed on a rear focal surface including the rear focal point, as an inverted image forward of the lamp. The projective optical member 28 is disposed such that the rear focal point thereof is positioned on an optical axis of the vehicular lamp 2 and near the reflecting surface of the micro mirror array 32. The projective optical member 28 may also be a reflector.

The light emitted from the light source 22 is reflected by the reflective optical member 24 and provided to the micro mirror array 32 of the optical deflection device 26. The optical deflection device 26 reflects light toward the projective optical member 28 by means of certain mirror elements 30 placed at the first reflecting position. The reflected light travels through the projective optical member 28 and frontward of the lamp to be provided to the individual regions R respectively corresponding to the mirror elements 30. Accordingly, a predetermined shape of light distribution pattern, configured by gathered multiple partial illuminated regions, can be produced in front of the lamp.

The visible light imager 35 is a device that captures an image of an area in front of the subject vehicle. The visible light imager 35 includes the high speed camera 36 and a low speed camera 38. The high speed camera 36 has a relatively high frame rate, which may be in the range from 200 fps to 10,000 fps inclusive (0.1-5 ms per frame), for example. The low speed camera 38 has a relatively low frame rate, which may be in the range from 30 fps to 120 fps inclusive (about 8-33 ms per frame), for example. Also, the high speed camera 36 has relatively low resolution, which may be 300,000 pixels or greater and less than 5,000,000 pixels, for example. Meanwhile, the low speed camera 38 has relatively high resolution, which may be 5,000,000 pixels or greater, for example. The high speed camera 36 and the low speed camera 38 capture an image of all the individual regions R. The resolution of the high speed camera 36 and the low speed camera 38 is not limited to the aforementioned values, and may be set to arbitrary values within a range that is technically consistent.

The far-infrared imager 52 is a device that captures an image of an area in front of the subject vehicle. The far-infrared imager 52 includes a far-infrared camera 54. The far-infrared camera 54 captures, as an image, heat generated by an object. The far-infrared camera 54 also captures, as an image, an infrared light component in the light reflected by a target present in front of the subject vehicle. The far-infrared camera 54 has a frame rate in the range from 5 fps to 10,000 fps inclusive (0.1-200 ms per frame), for example, and has resolution of 300,000 pixels or greater and less than 5,000,000 pixels, for example. The far-infrared camera 54 captures an image of all the individual regions R.

The control device 50 includes a luminance analyzer 14, a target analyzer 216, a lamp controller 18, and a light source controller 20. The image data acquired by the visible light imager 35 is transmitted to the luminance analyzer 14 and the target analyzer 216. Also, the image data acquired by the far-infrared imager 52 is transmitted to the target analyzer 216.

The luminance analyzer 14 detects the luminance of each individual region R based on the information (image data) acquired from the visible light imager 35. The luminance analyzer 14 is a high speed low-accuracy analyzer that performs less accurate image analysis, compared to the target analyzer 216, and outputs the analysis result at high speed. The luminance analyzer 14 of the present embodiment detects the luminance of each individual region R based on the information acquired from the high speed camera 36. The luminance analyzer 14 may detect the luminance of each individual region R every 0.1-5 ms, for example. The detection result from the luminance analyzer 14, i.e., a signal indicating luminance information of each individual region R, is transmitted to the lamp controller 18.

The target analyzer 216 detects a target present in front of the subject vehicle at least based on the information (image data) acquired from the far-infrared imager 52. The target analyzer 216 of the present embodiment also detects a target based on the information acquired from the low speed camera 38, in addition to the information acquired from the far-infrared imager 52. Accordingly, the target analyzer 216 is a low speed high-accuracy analyzer that performs highly accurate image analysis, compared to the luminance analyzer 14, and outputs the analysis result at low speed. The target analyzer 216 may detect a target every 50 ms, for example. The target detected by the target analyzer 216 may be an oncoming vehicle 100 or a pedestrian 200 as shown in FIG. 3, for example. The target may also be a preceding vehicle, an obstacle that may interfere with the traveling of the subject vehicle, a traffic sign, a traffic marking, or a road shape, for example.

For example, the target analyzer 216 may perform trimming and scaling on each of a piece of image data acquired from the low speed camera 38 and a piece of image data acquired from the far-infrared imager 52 to position the both pieces of image data. Also, the target analyzer 216 reverses the both pieces of image data in tone, as needed. With the tone reversal, binarization may also be performed. Thereafter, the both pieces of image data are synthesized by a bitwise AND operation, for example. The target analyzer 216 then detects a target based on the resulting image data. The both pieces of image data may be synthesized using a field sequential method.

The target analyzer 216 may detect a target using a conventionally well-known method, including algorithm recognition and deep learning. For example, the target analyzer 216 may retain a feature point indicating the oncoming vehicle 100 in advance. Accordingly, when there is data that includes the feature point indicating the oncoming vehicle 100 in the captured image data from the far-infrared imager 52 or the low speed camera 38, the target analyzer 216 recognizes the position of the oncoming vehicle 100. The "feature point indicating the oncoming vehicle 100" may be a light spot 102 (see FIG. 3) that has predetermined luminous intensity or higher and that appears in a region where a headlamp of the oncoming vehicle 100 is presumed to be present, for example. Similarly, the target analyzer 216 may retain a feature point indicating the pedestrian 200 or another target in advance, and, when there is data that includes the feature point in the captured image data from the far-infrared imager 52 or the low speed camera 38, the target analyzer 216 recognizes the position of the target corresponding to the feature point. The detection result from the target analyzer 216, i.e., a signal indicating information of a target in front of the subject vehicle, is transmitted to the lamp controller 18.

Using the detection result from at least one of the luminance analyzer 14 and the target analyzer 216, the lamp controller 18 performs determination of a specific target, detection of displacement of the specific target, setting of a specific individual region R1, and setting of the illuminance value of light emitted to each individual region R, for example. As an example, the lamp controller 18 includes a tracking unit 40 and an illuminance setting unit 42. The tracking unit 40 determines a specific target among the targets detected by the target analyzer 216. Also, the tracking unit 40 detects displacement of the specific target based on the detection result from the luminance analyzer 14. In the following, the case of setting the oncoming vehicle 100 as the specific target will be described as an example.

More specifically, the tracking unit 40 integrates the detection result from the luminance analyzer 14 with the detection result from the target analyzer 216. Among the luminances of the individual regions R detected by the luminance analyzer 14, the luminance of the individual region R in which a light spot 102 of the oncoming vehicle 100 as the specific target is positioned is related to the oncoming vehicle 100. Upon recognition of the position of the luminance related to the oncoming vehicle 100 in the detection result acquired thereafter from the luminance analyzer 14, the tracking unit 40 can detect displacement of the oncoming vehicle 100 as the specific target. The tracking unit 40 may perform processing for determining the specific target every 50 ms, for example. The tracking unit 40 may also perform processing (tracking) for detecting displacement of the specific target every 0.1-5 ms, for example.

Based on the detection result from the luminance analyzer 14 and the detection result from the target analyzer 216, the illuminance setting unit 42 determines the illuminance value of light emitted to each individual region R, including a specific illuminance value for the specific individual region R1 determined based on the position at which a predetermined target, i.e., the specific target, is present. In the present embodiment, the illuminance setting unit 42 determines the illuminance value of light emitted to each individual region R based on the detection result from the luminance analyzer 14 and the detection result from the tracking unit 40. By using the detection result from the tracking unit 40, the detection result from the target analyzer 216 is indirectly used.

The illuminance setting unit 42 starts with the determination of the specific individual region R1 based on the position at which the oncoming vehicle 100 as the specific target is present. For example, the illuminance setting unit 42 may determine the specific individual region R1 based on the position information of the oncoming vehicle 100 included in the detection result from the tracking unit 40. In the setting of the specific individual region R1, with respect to a horizontal distance a (see FIG. 3) between the two light spots 102 corresponding to the headlamps of the oncoming vehicle 100, the illuminance setting unit 42 may determine a vertical distance b having a predetermined ratio to the horizontal distance a, and may define, as the specific individual region R1 (see FIG. 3), an individual region R overlapping with a range of which the lateral dimension is a and the longitudinal dimension is b, for example. The specific individual region R1 includes the individual region R overlapping with the driver of the oncoming vehicle. The illuminance setting unit 42 then determines the specific illuminance value for the specific individual region R1.

The illuminance setting unit 42 also determines the illuminance value for each of the individual regions R other than the specific individual region R1. For example, for each individual region R of which the luminance detected by the luminance analyzer 14 is included within a predetermined range, among the individual regions R other than the specific individual region R1, the illuminance setting unit 42 sets the same value as a target luminance value. In other words, luminance equalization control is performed. The target luminance value means a luminance to be detected by the luminance analyzer 14 in a state where a light distribution pattern is produced.

FIG. 10 is a diagram that shows relationships between the detected luminance value and the set illuminance value in luminance equalization control. In the luminance equalization control, with regard to the individual regions R other than the specific individual region R1, a relatively high illuminance value is set for an individual region R of which the detected luminance is relatively low, and a relatively low illuminance value is set for an individual region R of which the detected luminance is relatively high, as shown in FIG. 10. With the luminance equalization control, a luminance equalization light distribution pattern for equalizing the brightness in front of the subject vehicle is produced. With the luminance equalization light distribution pattern, a target present in a dark region in front of the subject vehicle can be brightly illuminated. Accordingly, target detection accuracy of the target analyzer 216 can be improved. The "predetermined range" may be the entire range of luminance detectable by the luminance analyzer 14, or may be part of the entire range. In FIG. 10, the entire range of luminance detectable by the luminance analyzer 14 is defined as the "predetermined range".

Figure 11A:
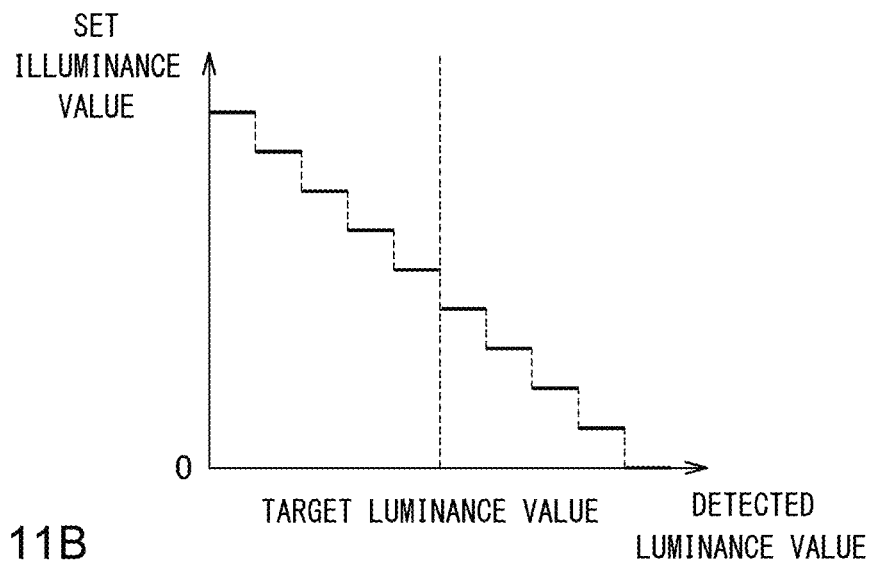
FIGS. 11A-11C are diagrams that show other examples of relationships between the detected luminance value and the set illuminance value in the luminance equalization control.
Figure 11B:
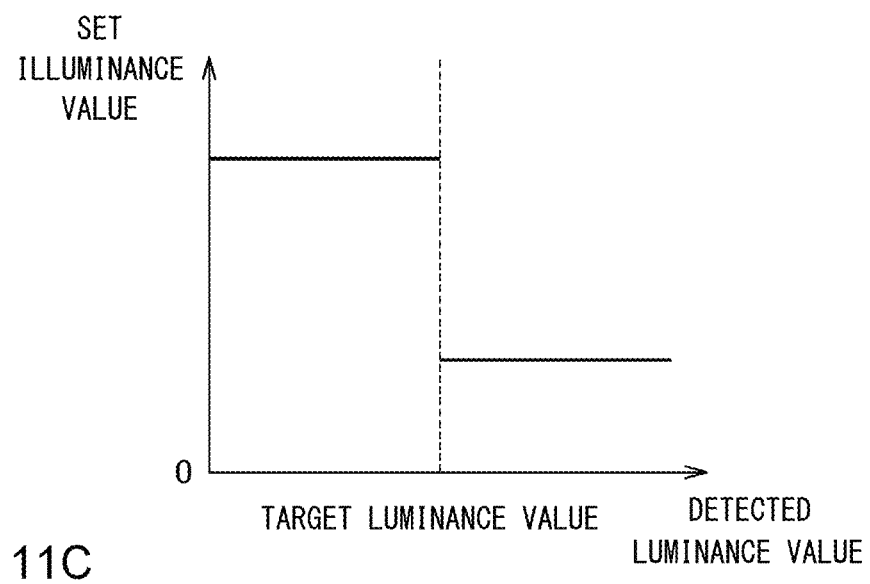
Figure 11C:
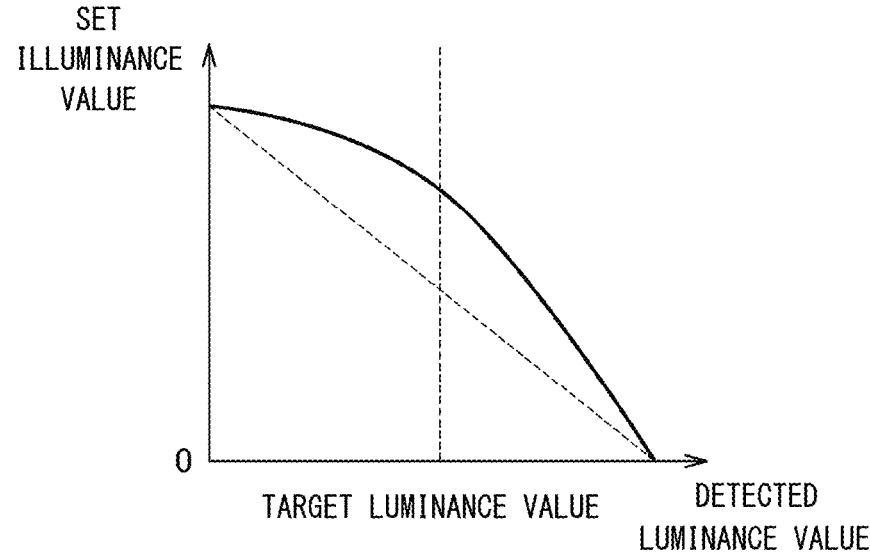

The relationships between the detected luminance value and the set illuminance value in the luminance equalization control may also be those described below. FIGS. 11A-11C are diagrams that show other examples of relationships between the detected luminance value and the set illuminance value in the luminance equalization control. More specifically, in the example shown in FIG. 10, the set illuminance value is continuously and linearly changed with respect to the detected luminance value. However, the relationships are not particularly limited thereto, and the set illuminance value may be changed in steps with respect to the detected luminance value, as shown in FIGS. 11A and 11B. Also, as shown in FIG. 11C, the set illuminance value may be curvedly changed with respect to the detected luminance value. Although FIG. 11C shows a curve forming an upward convex, it may be a curve forming a downward convex.

Figure 12A:
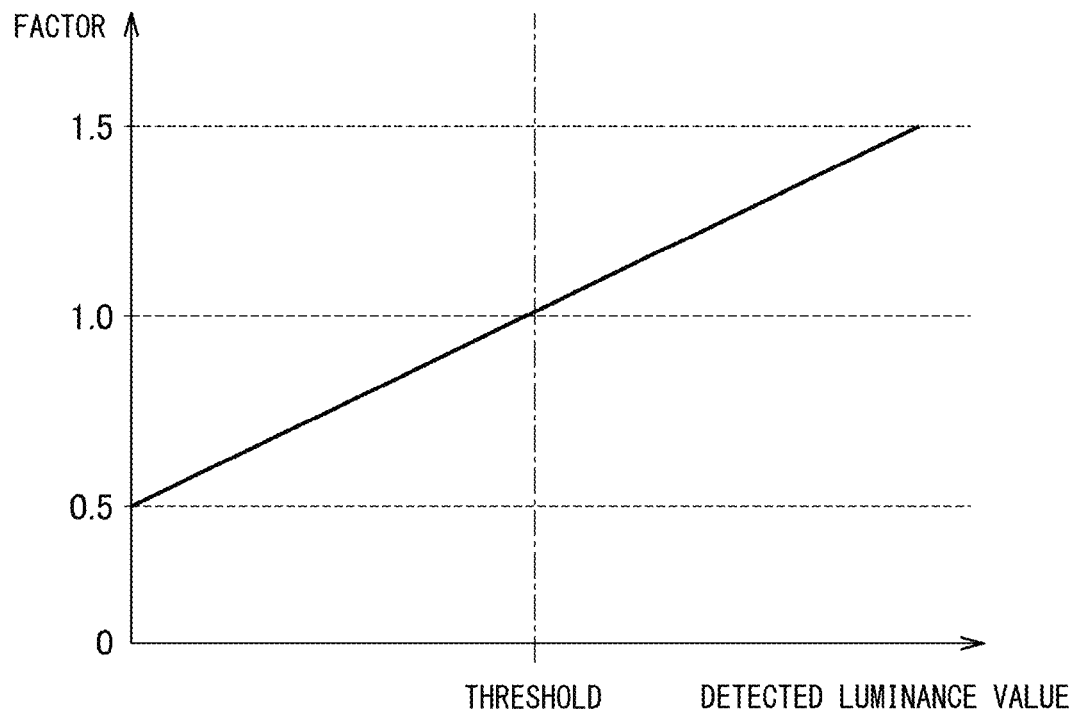
FIG. 12A is a diagram that shows relationships between the detected luminance value and a factor in high contrast control.
Figure 12B:
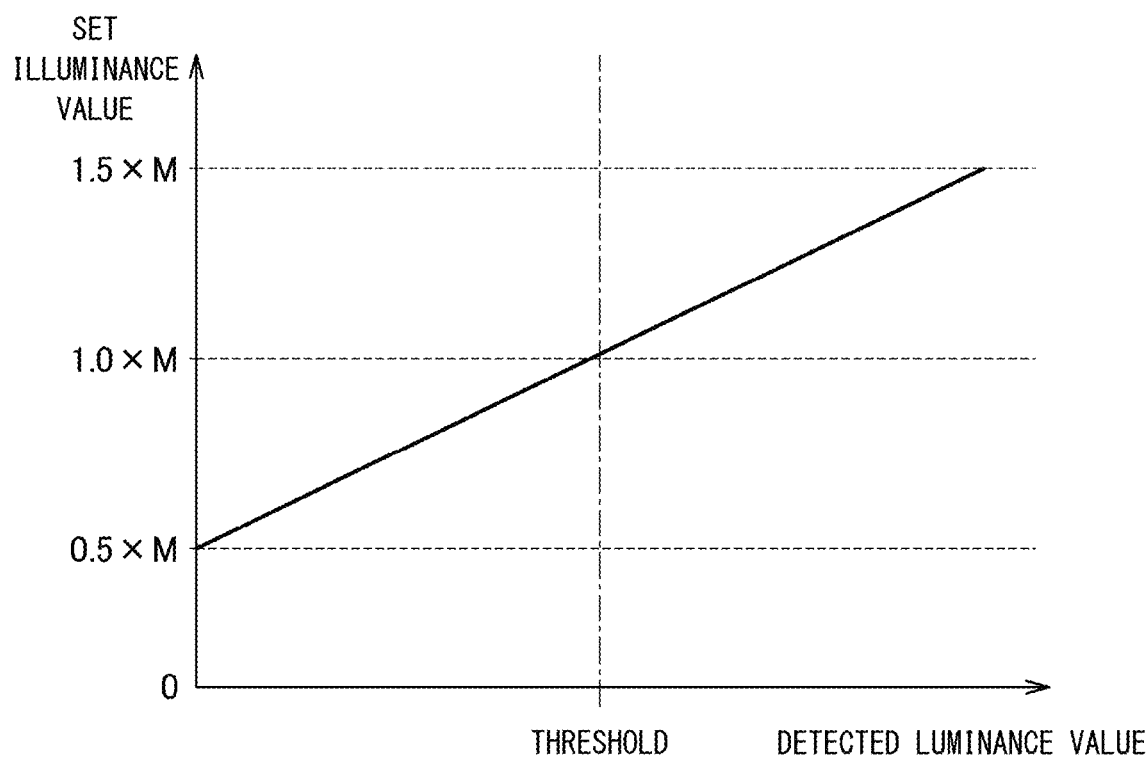
FIG. 12B is a diagram that shows relationships between the detected luminance value and the set illuminance value in the high contrast control.

The illuminance setting unit 42 may perform the high contrast control, instead of or in addition to the luminance equalization control. In the high contrast control, with regard to each individual region R of which the luminance detected by the luminance analyzer 14 is included within a predetermined range, among the individual regions R other than the specific individual region R1, a relatively low illuminance value is set for an individual region R of which the detected luminance is relatively low, and a relatively high illuminance value is set for an individual region R of which the detected luminance is relatively high. With the high contrast control, a high contrast light distribution pattern is produced. The "predetermined range" may be the entire range of luminance detectable by the luminance analyzer 14, or may be part of the entire range. In FIGS. 12A and 12B described below, the entire range of luminance detectable by the luminance analyzer 14 is defined as the "predetermined range".

For example, for an individual region R of which the luminance is lower than a threshold determined in advance, the illuminance setting unit 42 may set an illuminance value lower than that set for an individual region R of which the luminance is higher than the threshold. On the other hand, for an individual region R of which the luminance is higher than the threshold, the illuminance setting unit 42 may set an illuminance value higher than that set for an individual region R of which the luminance is lower than the threshold. How high or how low the illuminance value is to be set may be appropriately determined based on the results of experiments and simulations, in consideration of the degree of improvement in the target detection accuracy, for example.

As a result, the illuminance value for an individual region R of which the luminance is relatively low becomes lower than the illuminance value for an individual region R of which the luminance is relatively high. Conversely, the illuminance value for an individual region R of which the luminance is relatively high becomes higher than the illuminance value for an individual region R of which the luminance is relatively low. As an example, for an individual region R of which the luminance is lower than the threshold, the illuminance setting unit 42 may set an illuminance value lower than that currently set. On the other hand, for an individual region R of which the luminance is higher than the threshold, the illuminance setting unit 42 may set an illuminance value higher than that currently set. Instead of using the threshold, based on the luminance of the individual region R with the highest luminance, the illuminance value to be set may be lowered as the luminance decreases, for example.

With a high contrast light distribution pattern, bright individual regions R become brighter, and dark individual regions R become darker. The high contrast light distribution patterns highlight the contrast between brightness and darkness of an object illuminated by the light in front of the subject vehicle. Therefore, with a method or in a mode different from that of a luminance equalization light distribution pattern, the target detection accuracy of the target analyzer 216 can be improved.

In the high contrast control, a relatively low illuminance value to be newly set could be lower than the illuminance value currently set, and a relatively high illuminance value to be newly set could be higher than the illuminance value currently set. Accordingly, if a high contrast light distribution pattern is repetitively produced, positive feedback will occur, so that the set illuminance value will be eventually polarized into zero and a maximum value. If the illuminance value is polarized, it may be difficult to ensure the visibility, from the driver, of an individual region R for which the illuminance value is set to zero.

Meanwhile, using a reference illuminance value M and a factor as described below can avoid degradation of visibility from the driver caused by such polarization. FIG. 12A is a diagram that shows relationships between the detected luminance value and a factor in the high contrast control. FIG. 12B is a diagram that shows relationships between the detected luminance value and the set illuminance value in the high contrast control.

The illuminance setting unit 42 retains a predetermined factor set in advance based on the magnitude of the detected luminance value, as shown in FIG. 12A. A relatively large factor is set for a relatively large detected luminance value, and a relatively small factor is set for a relatively small detected luminance value. The value of the factor may be appropriately determined based on the results of experiments and simulations, in consideration of the degree of improvement in the target detection accuracy, for example. As an example, in the embodiment, the factor is set to 1.0 for the threshold of the detected luminance value, to 1.5 for the maximum luminance value, and to 0.5 for the minimum luminance value. Based on the detection result from the luminance analyzer 14, the illuminance setting unit 42 sets the factor for each of the individual regions R other than the specific individual region R1.

The illuminance setting unit 42 also retains a predetermined reference illuminance value M set in advance, as shown in FIG. 12B. The illuminance setting unit 42 multiplies the reference illuminance value M by the factor set for each individual region R, so as to set the illuminance value for the individual region R. Accordingly, a low illuminance value is set for an individual region R of which the detected luminance value is low, and a high illuminance value is set for an individual region R of which the detected luminance value is high.

Also by using, instead of the reference illuminance value M, the illuminance value currently set for each individual region R, the factor, and a lower limit and an upper limit of the illuminance value, degradation of visibility from the driver caused by illuminance value polarization can be avoided. More specifically, the illuminance setting unit 42 retains a lower limit and an upper limit of the illuminance value set in advance. The illuminance setting unit 42 sets the predetermined factor for each individual region R based on the magnitude of the detected luminance value. The illuminance setting unit 42 then multiplies the current illuminance value by the factor thus set, so as to calculate a new illuminance value.

When the calculated illuminance value is greater than or equal to a predetermined lower limit, the illuminance setting unit 42 changes the current illuminance value to the calculated illuminance value, and, when the calculated illuminance value is lower than the lower limit, the illuminance setting unit 42 maintains the current illuminance value. Also, when the calculated illuminance value is lower than or equal to a predetermined upper limit, the illuminance setting unit 42 changes the current illuminance value to the calculated illuminance value, and, when the calculated illuminance value is greater than the upper limit, the illuminance setting unit 42 maintains the current illuminance value. If the illuminance setting unit 42 retains at least the lower limit of the illuminance value, the situation can be avoided in which the illuminance value for a dark individual region R is set to zero.

Also by providing, in addition to the light source unit 10 for producing a high contrast light distribution pattern, another light source unit (not illustrated) controlled independently from the light source unit 10, degradation of visibility from the driver caused by the aforementioned polarization can be avoided. For example, the vehicular lamp system 1 is provided with a conventionally well-known lamp unit of which the turning on and off can be switched and the type of the light distribution pattern to be produced can be changed when the driver operates a light switch, not illustrated, provided on the vehicle. The lamp unit can produce conventionally well-known low beam light distribution pattern and high beam light distribution pattern, for example. In the following, a light distribution pattern produced by the lamp unit may be referred to as a general light distribution pattern, as appropriate.

The illuminance setting unit 42 performs the high contrast control in a state where the lamp unit produces a general light distribution pattern. As a result, a high contrast light distribution pattern is superimposed upon the general light distribution pattern. Even if the illuminance of each individual region R in the high contrast light distribution pattern is polarized, since the general light distribution pattern is provided to an individual region R of which the illuminance in the high contrast light distribution pattern is low, the visibility from the driver can be ensured.

As an example, at the beginning of the high contrast control, the illuminance setting unit 42 allows the light source unit 10 to produce a light distribution pattern in which the illuminance of every individual region R other than the specific individual region R1 is made constant. The luminance of each individual region R obtained by the irradiation of such an illuminance constant light distribution pattern is used to produce a high contrast light distribution pattern. When a lamp unit is provided in addition to the light source unit 10, a general light distribution pattern may be produced by means of the lamp unit at the beginning of the high contrast control. In this case, the luminance of each individual region R obtained by the irradiation of the general light distribution pattern is used to produce a high contrast light distribution pattern.

Figure 13A:
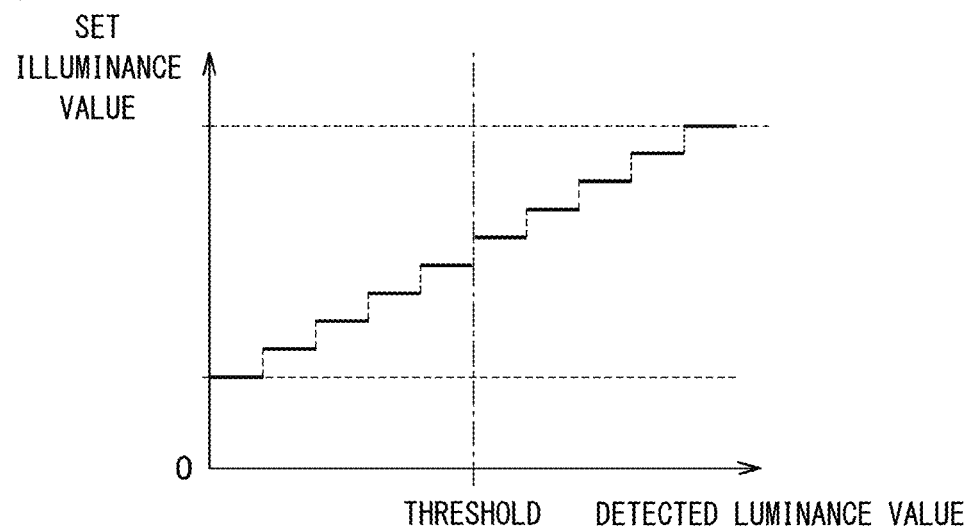
FIGS. 13A-13C are diagrams that show other examples of relationships between the detected luminance value and the set illuminance value in the high contrast control.
Figure 13B:
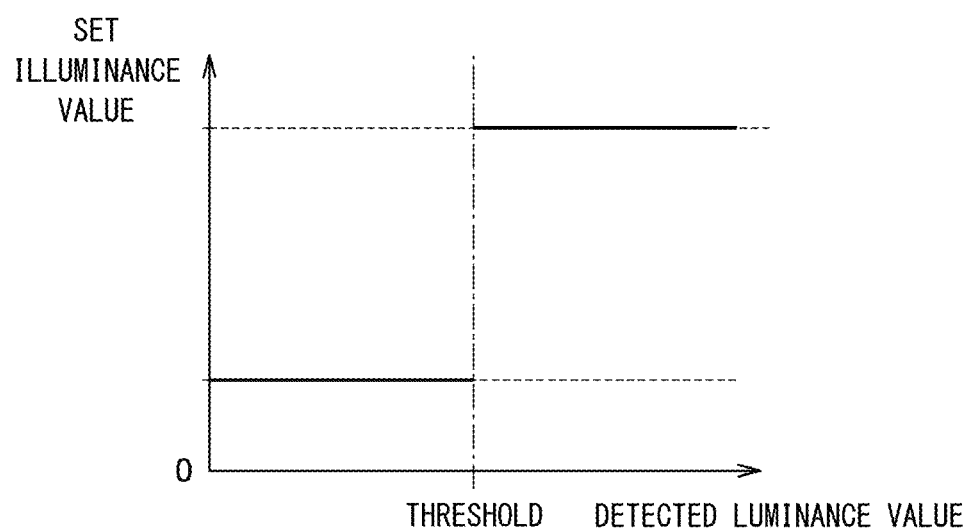
Figure 13C:
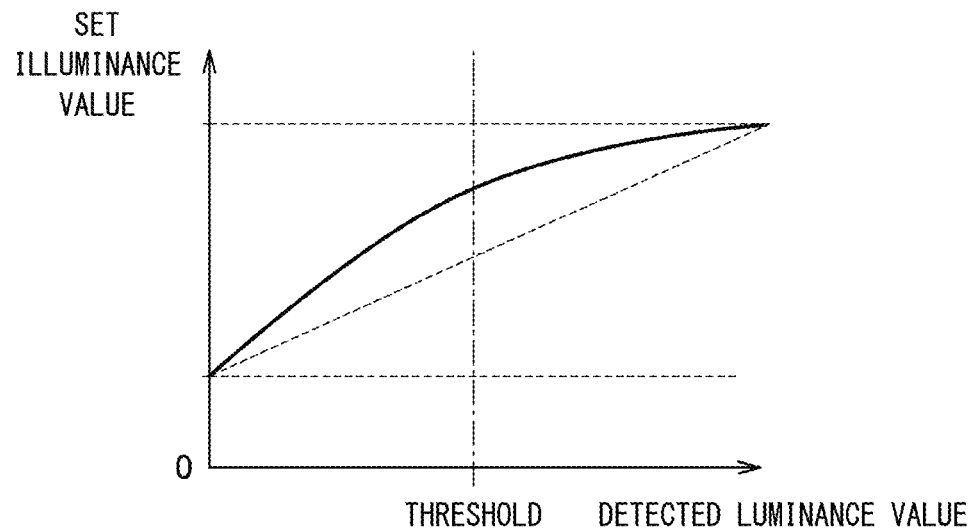

The relationships between the detected luminance value and the set illuminance value in the high contrast control may also be those described below. FIGS. 13A-13C are diagrams that show other examples of relationships between the detected luminance value and the set illuminance value in the high contrast control. More specifically, in the example shown in FIG. 12B, the set illuminance value is continuously and linearly changed with respect to the detected luminance value. However, the relationships are not particularly limited thereto, and the set illuminance value may be changed in steps with respect to the detected luminance value, as shown in FIGS. 13A and 13B. Also, as shown in FIG. 13C, the set illuminance value may be curvedly changed with respect to the detected luminance value. Although FIG. 13C shows a curve forming an upward convex, it may be a curve forming a downward convex. The relationships between the detected luminance value and the factor are similar to those between the detected luminance value and the set illuminance value and hence are obvious without illustration thereof.

The illuminance setting unit 42 recognizes displacement of the specific individual region R1 based on the detection result from the tracking unit 40 and updates the position information of the specific individual region R1. The illuminance setting unit 42 then also updates the illuminance value for each individual region R, including the specific illuminance value for the specific individual region R1. The process at the tracking unit 40 and the process at the illuminance setting unit 42 are performed in parallel at least at one point in time. The illuminance setting unit 42 transmits a signal indicating the illuminance value for each individual region R to the light source controller 20. The illuminance setting unit 42 may set the illuminance value every 0.1-5 ms, for example.

The light source controller 20 controls the light source unit 10 based on the illuminance values determined at the illuminance setting unit 42. The light source controller 20 controls turning on and off of the light source 22 and switching between on and off states of each mirror element 30. Based on the illuminance value of light emitted to each individual region R, the light source controller 20 adjusts the on-time ratio (width or density) of each mirror element 30. Accordingly, the illuminance of light emitted to each individual region R can be adjusted. The light source controller 20 may transmit a drive signal to at least one of the light source 22 and the optical deflection device 26 every 0.1-5 ms, for example. The light source unit 10 emits light based on the illuminance values determined at the illuminance setting unit 42, and the resulting actual luminance value of each individual region R is detected by the luminance analyzer 14. Based on the detection result, the illuminance setting unit 42 sets each illuminance value again.

The vehicular lamp system 1 performs the adaptive driving beam (ADB) control for producing an optimum light distribution pattern based on the position of a specific target present in front of the subject vehicle. As an example, the illuminance setting unit 42 sets "0" as the specific illuminance value for the specific individual region R1 determined based on the position at which the oncoming vehicle 100 is present, and sets "1" as the illuminance value for the other individual regions R. This setting is defined as first illuminance information. The illuminance setting unit 42 also sets the illuminance values for all the individual regions R including the specific individual region R1, appropriately for the luminance equalization control or the high contrast control. This setting is defined as second illuminance information.

The illuminance setting unit 42 then performs an AND operation on the first illuminance information and the second illuminance information. This generates illuminance information that includes "0" as the specific illuminance value for the specific individual region R1, and illuminance values for the other individual regions R determined appropriately for the luminance equalization control or the high contrast control. More specifically, the specific individual region R1 is shaded from light, and a luminance equalization light distribution pattern or a high contrast light distribution pattern is produced for each of the individual regions R other than the specific individual region R1.

When the specific target is the pedestrian 200, a specific target luminance value may be set to a value higher than that for the other individual regions R, for example. Accordingly, the pedestrian 200 is illuminated by light with a higher illuminance, so that the driver of the subject vehicle can visually recognize the pedestrian 200 more easily. In this case, the individual region R in which the face of the pedestrian 200 is positioned may desirably be shaded from light. By performing publicly-known image processing, such as edge enhancement, on the luminance data of each individual region R as the detection result from the luminance analyzer 14, the tracking unit 40 can detect the position of the pedestrian 200. The edge enhancement may be included in the processing performed by the luminance analyzer 14.

Figure 14A:
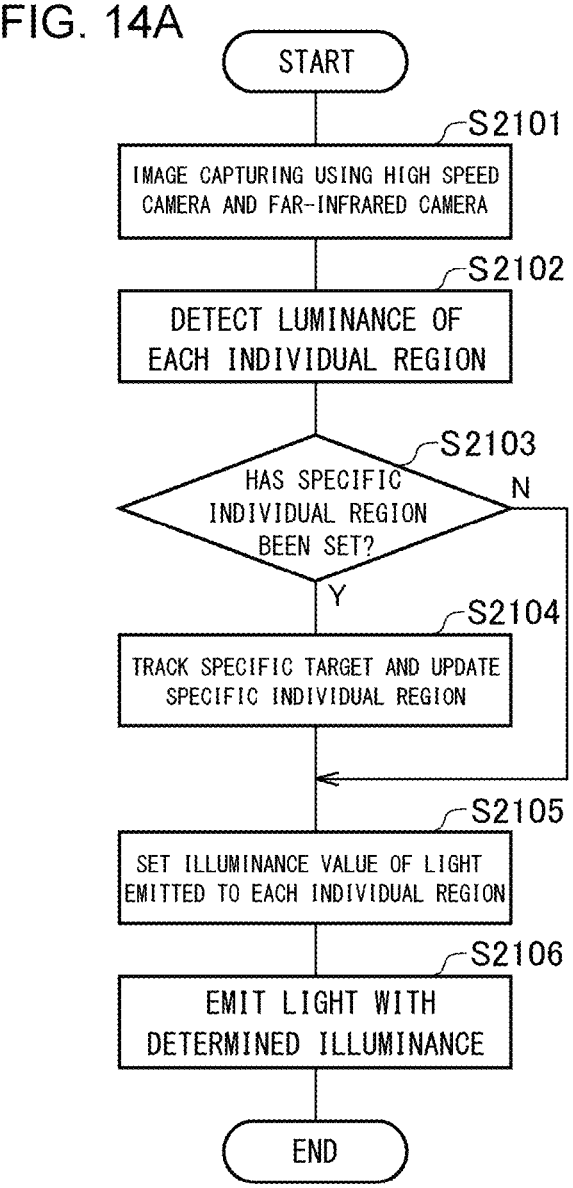
FIGS. 14A and 14B are flowcharts that each show an example of ADB control performed in the vehicular lamp system according to the fifth embodiment.
Figure 14B:
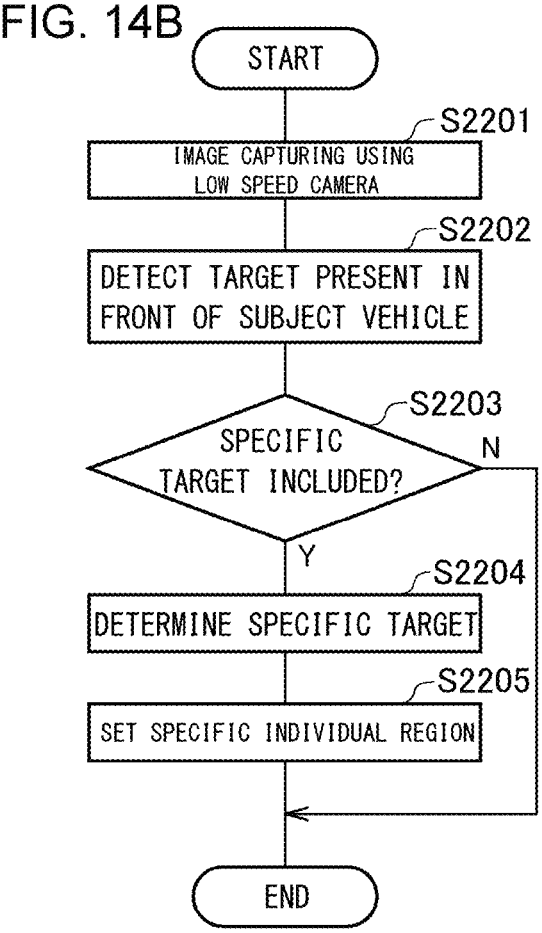

FIGS. 14A and 14B are flowcharts that each show an example of ADB control performed in the vehicular lamp system according to the fifth embodiment. In each of the flowcharts, when an instruction to perform ADB control is provided by means of a light switch or the like, not illustrated, and, in addition, the ignition switch has been turned on, the processing is repeatedly performed at predetermined timing; when the instruction to perform ADB control is cancelled (or a stop instruction is provided) or when the ignition switch is turned off, the processing terminates. The flowchart of FIG. 14A shows high speed processing repeated every 0.1-5 ms, for example, and the flowchart of FIG. 14B shows low speed processing repeated every 50 ms, for example. The low speed processing is performed in parallel with the high speed processing.

As shown in FIG. 14A, in the high speed processing, each of the high speed camera 36 and the far-infrared camera 54 captures an image of an area in front of the subject vehicle (S2101). Based on the image data from the high speed camera 36, the luminance analyzer 14 detects the luminance of each individual region R (S2102). The image data acquired by the far-infrared camera 54 is transmitted to the target analyzer 216. Subsequently, it is judged if the specific individual region R1 has been set (S2103). The judgement may be performed at the tracking unit 40, for example. When the specific individual region R1 has been set (Y at S2103), the tracking unit 40 tracks the specific target to detect the position (displacement) of the specific individual region R1. Based on the detection result from the tracking unit 40, the illuminance setting unit 42 updates the setting (position information) of the specific individual region R1 (S2104).

The illuminance setting unit 42 then sets the illuminance value of light emitted to each individual region R (S2105). For the specific individual region R1, the specific illuminance value is set. For each of the rest of the individual regions R, an illuminance value appropriate for a luminance equalization light distribution pattern or a high contrast light distribution pattern is set. Thereafter, the light source controller 20 drives the light source unit 10, which then emits light with a determined illuminance (S2106), and the routine is terminated. When the specific individual region R1 has not been set (N at S2103), the illuminance setting unit 42 sets the illuminance value of light emitted to each individual region R (S2105). In this case, the specific illuminance value is not included in the set illuminance values. Thereafter, the processing of the step S2106 is performed, and the routine is terminated.

In the step S2104, when disappearance of the specific target is detected in the tracking, the setting of the specific individual region R1 is also removed. Accordingly, the specific illuminance value is not included in the illuminance values set in the step S2105. Also, in the step S2103 of the next routine, it is judged that the specific individual region R1 has not been set (N at S2103), until the processing of the step S2205, which will be described later, is performed.

As shown in FIG. 14B, in the low speed processing, the low speed camera 38 captures an image of an area in front of the subject vehicle (S2201). Based on the image data from the low speed camera 38 and the far-infrared camera 54, the target analyzer 216 detects a target present in front of the subject vehicle (S2202). Thereafter, it is judged if the specific target is included in the detected targets (S2203). The judgement may be performed at the tracking unit 40, for example.

When the specific target is included (Y at S2203), the tracking unit 40 determines the specific target (S2204). Thereafter, the illuminance setting unit 42 sets the specific individual region R1 based on the position at which the specific target is present (S2205), and the routine is terminated. When the specific target is not included (N at S2203), the routine is terminated. Although the specific individual region is set in the low speed processing in the abovementioned flowcharts, such setting may be performed in the high speed processing.

As described above, the vehicular lamp system 1 according to the present embodiment includes the light source unit 10, visible light imager 35, far-infrared imager 52, luminance analyzer 14, target analyzer 216, tracking unit 40, illuminance setting unit 42, and light source controller 20. The light source unit 10 can independently control the illuminance of light emitted to each of multiple individual regions R. The luminance analyzer 14 detects the luminance of each individual region R. The target analyzer 216 detects a target present in front of the subject vehicle. The tracking unit 40 determines a specific target among the targets detected by the target analyzer 216 and detects displacement of the specific target based on the detection result from the luminance analyzer 14. Based on the detection result from the luminance analyzer 14 and the detection result from the tracking unit 40, the illuminance setting unit 42 determines the illuminance value for each individual region R, including the specific illuminance value for the specific individual region R1 determined based on the position at which the specific target is present. The light source controller 20 controls the light source unit 10 based on the illuminance values determined at the illuminance setting unit 42.

The target analyzer 216 detects a target based on the image data acquired from the visible light imager 35 and the image data acquired from the far-infrared imager 52. Accordingly, compared to the case of detecting a target only based on the image data acquired from the visible light imager 35, the target can be detected more accurately.

The target analyzer 216 can detect a target highly accurately but requires relatively long time for image processing, so that the analysis speed thereof is slower. Accordingly, if the ADB control is performed only based on the analysis result from the target analyzer 216 and when the specific target is the oncoming vehicle 100, for example, a light distribution pattern in which a light shielded area is narrowed down to improve the visibility from the driver of the subject vehicle can be produced, but moving the light shielded area to accurately follow the displacement of the oncoming vehicle 100 will be difficult.

On the other hand, the luminance analyzer 14 performs simple luminance detection and requires relatively short time for image processing, enabling high speed analysis. However, since the target detection accuracy thereof is low, accurate recognition of the position at which a target is present is difficult. Accordingly, if the ADB control is performed only based on the analysis result from the luminance analyzer 14, a larger light shielded area needs to be set in a light distribution pattern, so that the visibility from the driver of the subject vehicle may be sacrificed.

Meanwhile, in the vehicular lamp system 1 of the present embodiment, the target analyzer 216, which is a low speed but advanced image analysis means, and the luminance analyzer 14, which is a simple but high speed image analysis means, are used in combination to highly accurately recognize the position at which the oncoming vehicle 100 is present, and the light distribution pattern is determined based thereon. Accordingly, the light irradiation accuracy, or the light distribution pattern production accuracy, of the vehicular lamp 2 can be improved. As a result, both avoidance of glare provided to the driver of the oncoming vehicle 100 and ensuring of visibility from the driver of the subject vehicle can be achieved at a higher level.

The visible light imager 35 of the present embodiment includes the high speed camera 36 and the low speed camera 38. The luminance analyzer 14 detects a luminance based on the information acquired from the high speed camera 36. Also, the target analyzer 216 detects a target based on the information acquired from the low speed camera 38 and the far-infrared imager 52. In this way, since each of the luminance analyzer 14 and the target analyzer 216 is assigned a camera, a camera specialized in performance required for each image analysis can be employed. Generally, a camera provided with both the performance required for the image analysis by the luminance analyzer 14 and the performance required for the image analysis by the target analyzer 216 is expensive. Therefore, according to the present embodiment, cost reduction of the imager 12 or, furthermore, cost reduction of the vehicular lamp system 1 can be achieved.

Also, the illuminance setting unit 42 of the present embodiment produces at least one of a luminance equalization light distribution pattern and a high contrast light distribution pattern for each of the individual regions R other than the specific individual region R1. Accordingly, target detection accuracy of the target analyzer 216 can be improved. As a result, light irradiation accuracy of the vehicular lamp 2 can be further improved.

Sixth Embodiment

The vehicular lamp system according to the sixth embodiment has a configuration in common with the vehicular lamp system according to the fifth embodiment, except that the tracking unit 40 performs tracking based on the image data from the far-infrared imager 52. In the following, the vehicular lamp system according to the sixth embodiment will be described mainly for configurations different from those in the fifth embodiment, and description of configurations in common will be briefly given or may be omitted.

As with the vehicular lamp system 1 according to the fifth embodiment, the vehicular lamp system 1 according to the present embodiment includes the visible light imager 35, far-infrared imager 52, luminance analyzer 14, target analyzer 216, tracking unit 40, illuminance setting unit 42, light source controller 20, and light source unit 10.

The tracking unit 40 of the present embodiment detects displacement of a specific target based on the image data from the far-infrared imager 52. Accordingly, the far-infrared camera 54 may preferably be a high speed camera equivalent to the high speed camera 36 and have a frame rate in the range from 200 fps to 10,000 fps inclusive (0.1-5 ms per frame), for example. More specifically, the image data from the far-infrared imager 52 is transmitted to the lamp controller 18 via the target analyzer 216 every 0.1-5 ms, for example. The tracking unit 40 relates, among temperature values of individual regions R detected by the far-infrared imager 52, the temperature value of an individual region R in which a specific target is positioned, to the specific target. Upon recognition of the position of the temperature value related to the specific target in the image data acquired thereafter from the far-infrared imager 52, the tracking unit 40 can detect displacement of the specific target. Accordingly, the present embodiment provides the same effects as the fifth embodiment.

Also, with regard to the individual region R related to a specific target on the image data from the far-infrared imager 52, when the specific target is the oncoming vehicle 100, for example, it is highly possible that the individual region R overlaps with the driver of the oncoming vehicle 100. Accordingly, the illuminance setting unit 42 may define the individual region R related to the specific target as the specific individual region R1.

Seventh Embodiment

The vehicular lamp system according to the seventh embodiment is largely different from the vehicular lamp system according to the fifth or sixth embodiment in that the target analyzer 216 detects a target only based on the image data from the far-infrared imager 52. In the following, the vehicular lamp system according to the seventh embodiment will be described mainly for configurations different from those in the fifth or sixth embodiment, and description of configurations in common will be briefly given or may be omitted.

Figure 15:
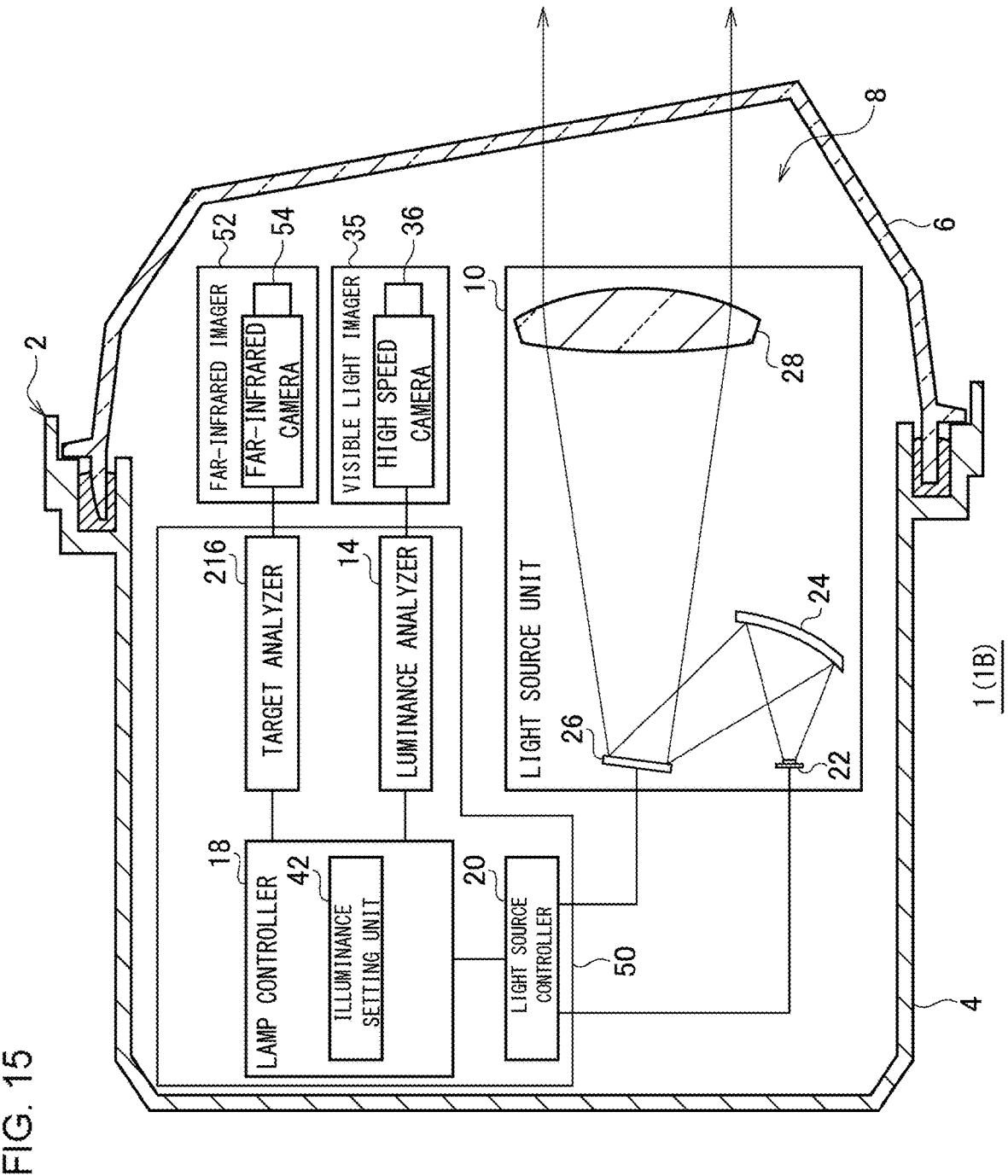
FIG. 15 is a diagram that shows a schematic configuration of a vehicular lamp system according to a seventh embodiment.

FIG. 15 is a diagram that shows a schematic configuration of a vehicular lamp system according to the seventh embodiment. The vehicular lamp system 1 (1B) according to the present embodiment includes the light source unit 10, visible light imager 35, far-infrared imager 52, and control device 50. The structure of the light source unit 10 is the same as that of the light source unit 10 in the fifth embodiment. The visible light imager 35 only includes the high speed camera 36. The far-infrared imager 52 includes the far-infrared camera 54.

The control device 50 includes the luminance analyzer 14, target analyzer 216, lamp controller 18, and light source controller 20. The luminance analyzer 14 detects the luminance of each individual region R based on the information acquired from the high speed camera 36. The luminance analyzer 14 may detect the luminance of each individual region R every 0.1-5 ms, for example.

The target analyzer 216 detects a target present in front of the subject vehicle only based on the information acquired from the far-infrared imager 52. The target analyzer 216 recognizes every object having a temperature value greater than or equal to a predetermined temperature value, as a target. Also, in the present embodiment, all the targets detected by the target analyzer 216 are regarded as specific targets. The far-infrared camera 54 may preferably be a high speed camera equivalent to the high speed camera 36 and have a frame rate in the range from 200 fps to 10,000 fps inclusive (0.1-5 ms per frame), for example. Accordingly, the target analyzer 216 may detect a target every 0.1-5 ms, for example. Since all the targets detected by the target analyzer 216 are regarded as specific targets in the present embodiment, repetitive target detections by the target analyzer 216 correspond to detections of displacement of specific targets. Accordingly, the target analyzer 216 also functions as the tracking unit 40 in the fifth embodiment. Therefore, the lamp controller 18 of the present embodiment includes the illuminance setting unit 42 but does not include the tracking unit 40.

Based on the detection result from the luminance analyzer 14 and the detection result from the target analyzer 216, the illuminance setting unit 42 determines the illuminance value of light emitted to each individual region R, including the specific illuminance value for the specific individual region R1. The light source controller 20 controls the light source unit 10 based on the illuminance values determined at the illuminance setting unit 42.

The target analyzer 216 may perform target detection in a limited and predetermined region in the image data from the far-infrared imager 52. The predetermined region may be a region in which an oncoming vehicle, a preceding vehicle, or a pedestrian is presumed to be present, for example. Such a region may be appropriately determined by the designer based on the results of experiments and simulations. Accordingly, the time required for target detection by the target analyzer 216 can be reduced. Also, the possibility of regarding, as a specific target, an object that should not be normally set as a specific target can be reduced.

Also, multiple regions in which target detection is performed may be provided, and the setting of the specific illuminance value may be made different for each region. For example, every target detected in a region where an oncoming vehicle or a preceding vehicle is presumed to be present may be shaded from light, and every target detected in a region where a pedestrian is presumed to be present may be illuminated by light with a high illuminance.

In the present embodiment, a target is detected using the far-infrared camera 54, which is a high speed camera, similarly to the high speed camera 36. Accordingly, the target detection processing shown in FIG. 14B, which has been described as low speed processing in the fifth embodiment, can be performed at a speed equivalent to that of the high speed processing shown in FIG. 14A. In this case, the step S2101 in FIG. 14A can be changed to "IMAGE CAPTURING USING HIGH SPEED CAMERA", and the step S2201 in FIG. 14B can be changed to "IMAGE CAPTURING USING FAR-INFRARED CAMERA". Accordingly, a produced light distribution pattern can be made to promptly follow a change of the condition in front of the subject vehicle. Therefore, light irradiation accuracy of the vehicular lamp 2 can be improved.

The present invention is not limited to the fifth through seventh embodiments stated above. It is to be understood that combinations of the embodiments or various modifications, including design modifications, may be made based on the knowledge of those skilled in the art and that embodiments obtained by such combinations and modifications are also within the scope of the present invention. Such an additional embodiment has the effect of each of the combined embodiments and modifications.

In the fifth through seventh embodiments, although the visible light imager 35, far-infrared imager 52, luminance analyzer 14, target analyzer 216, lamp controller 18, and light source controller 20 are provided within the lamp chamber 8, each of the components may be provided outside the lamp chamber 8 as appropriate. For example, as the low speed camera 38 of the visible light imager 35, an existing camera mounted within the vehicle cabin may be used. The viewing angle of the visible light imager 35 may desirably be the same as that of the light source unit 10, and the viewing angle of the far-infrared imager 52 may also desirably be the same as that of the light source unit 10.

If the high speed camera 36 has resolution equivalent to that of the low speed camera 38, the low speed camera 38 may be omitted. This enables downsizing of the vehicular lamp system 1. In this case, the target analyzer 216 in the fifth and sixth embodiments detects a target using image data from the far-infrared imager 52 and the high speed camera 36.

The light source unit 10 may include, instead of the optical deflection device 26 which is a DMD, a scanning optical system for scanning an area in front of the subject vehicle using light from the light source, or an LED array in which LEDs corresponding to the respective individual regions R are arranged.

The following aspects may also be included in the present invention.

A control device 50 for a vehicular lamp 2, the control device 50 comprising:
a luminance analyzer 14 that detects a luminance of each of a plurality of individual regions R arranged in front of the subject vehicle, on the basis of information acquired from a visible light imager 35;
a target analyzer 216 that detects a target present in front of the subject vehicle, at least on the basis of information acquired from a far-infrared imager 52;
an illuminance setting unit 42 that determines, on the basis of a detection result from the luminance analyzer 14 and a detection result from the target analyzer 216, the illuminance value of light emitted to each individual region R, including a specific illuminance value for a specific individual region R1 determined on the basis of the position at which a predetermined target is present; and
a light source controller 20 that controls a light source unit 10 that independently controls the illuminance of light emitted to each individual region R, on the basis of an illuminance value determined at the illuminance setting unit 42.

A control method for a vehicular lamp 2, the control method comprising:
detecting a luminance of each of a plurality of individual regions R arranged in front of the subject vehicle, on the basis of information acquired from a visible light imager 35;
detecting a target present in front of the subject vehicle, at least on the basis of information acquired from a far-infrared imager 52;
determining, on the basis of a detection result in the detecting a luminance and a detection result in the detecting a target, the illuminance value of light emitted to each individual region R, including a specific illuminance value for a specific individual region R1 determined on the basis of the position at which a predetermined target is present; and controlling a light source unit 10 that independently controls the illuminance of light emitted to each individual region R, on the basis of a determined illuminance value.

What is claimed is:

1. A vehicular lamp system, comprising:
an imager that captures an image of an area in front of the subject vehicle;
a luminance analyzer that detects a luminance of each of a plurality of individual regions arranged in front of the subject vehicle, on the basis of information acquired from the imager;
an illuminance setting unit that determines an illuminance value of light emitted to each individual region, on the basis of a detection result from the luminance analyzer;
a light source unit that independently controls the illuminance of light emitted to each of the plurality of individual regions; and
a light source controller that controls the light source unit on the basis of an illuminance value determined at the illuminance setting unit, wherein
within the same information obtained from the imager unit, the plurality of individual regions include an individual region that falls within a first predetermined luminance range and an individual region that falls within a second predetermined luminance range, and
the illuminance setting unit uses different functions to determine the illuminance value for an individual region that falls within the first luminance range, and the illuminance value for an individual region that falls within the second luminance range.

2. The vehicular lamp system of claim 1, wherein the illuminance setting unit sets the illuminance value for the individual region falling within the first luminance range on the basis of the luminance detected by the luminance analyzer, and sets the illuminance value for the individual region falling within the second luminance range irrespective of the luminance detected by the luminance analyzer.

3. The vehicular lamp system of claim 1, wherein:
the illuminance setting unit sets the illuminance value for the individual region falling within the first luminance range and the individual region falling within the second luminance range, on the basis of the luminance detected by the luminance analyzer; and
the correspondence relationship between the detected luminance and the set illuminance is set differently for each of the first luminance range and the second luminance range.

4. The vehicular lamp system of claim 2, wherein the first luminance range includes luminances lower than those in the second luminance range.

5. The vehicular lamp system of claim 4, wherein the illuminance value for the individual region falling within the first luminance range has a positive correlation with the luminance.

6. The vehicular lamp system of claim 3, wherein each of the illuminance value for the individual region falling within the first luminance range and the illuminance value for the individual region falling within the second luminance range has a positive correlation with the luminance.

7. The vehicular lamp system of claim 1, wherein, for an individual region falling within a predetermined third luminance range, which includes luminances higher than those in the first luminance range and the second luminance range, the illuminance setting unit sets the illuminance value on the basis of the luminance detected by the luminance analyzer such that the illuminance value has a negative correlation with the luminance, or the illuminance setting unit sets the illuminance value to zero irrespective of the luminance detected by the luminance analyzer.

8. A control device for a vehicular lamp, the control device comprising:
- a luminance analyzer that detects a luminance of each of a plurality of individual regions arranged in front of the subject vehicle, on the basis of information acquired from an imager that captures an image of an area in front of the subject vehicle;
- an illuminance setting unit that determines an illuminance value of light emitted to each individual region, on the basis of a detection result from the luminance analyzer; and
- a light source controller that controls a light source unit that independently controls the illuminance of light emitted to each individual region, on the basis of an illuminance value determined at the illuminance setting unit, wherein
- within the same information obtained from the imager unit, the plurality of individual regions include an individual region that falls within a first predetermined range and an individual region that falls within a second predetermined range, and
- the illuminance setting unit uses different functions to determine the illuminance value for an individual region of which the luminance is included in the first range, and the illuminance value for an individual region of which the luminance is included in the second range.

9. A control method for a vehicular lamp, the control method comprising:
- detecting a luminance of each of a plurality of individual regions arranged in front of the subject vehicle, on the basis of information acquired from an imager that captures an image of an area in front of the subject vehicle;
- determining an illuminance value of light emitted to each individual region, on the basis of a detected luminance; and
- controlling a light source unit that independently controls the illuminance of light emitted to each individual region, on the basis of a determined illuminance value, wherein,
- within the same information obtained from the imager unit, the plurality of individual regions include an individual region that falls within a first predetermined luminance range and an individual region that falls within a second predetermined luminance range, and
- in the determining an illuminance value, different functions are used to determine the illuminance value for an individual region of which the luminance is included in the first range, and the illuminance value for an individual region of which the luminance is included in the second range.

* * * * *